(12) United States Patent
Sorensen et al.

(10) Patent No.: US 10,028,603 B2
(45) Date of Patent: *Jul. 24, 2018

(54) CLOSURE FOR AN OPENING IN A LID

(71) Applicant: RUNWAY BLUE, LLC, Lehi, UT (US)

(72) Inventors: Steven M. Sorensen, Alpine, UT (US); David O. Meyers, East Layton, UT (US)

(73) Assignee: Runway Blue, LLC, Alpine, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,360

(22) Filed: Jul. 18, 2016

(65) Prior Publication Data

US 2016/0324344 A1 Nov. 10, 2016

Related U.S. Application Data

(63) Continuation of application No. 14/598,075, filed on Jan. 15, 2015, now Pat. No. 9,392,893, which is a (Continued)

(51) Int. Cl.
*A47G 19/22* (2006.01)
*B65D 25/28* (2006.01)
(Continued)

(52) U.S. Cl.
CPC ...... *A47G 19/2272* (2013.01); *A47J 43/1087* (2013.01); *A47J 43/27* (2013.01);
(Continued)

(58) Field of Classification Search
CPC ........ B65D 47/20; B65D 47/06; B65D 43/26; B65D 43/16; B65D 25/28; A47G 19/2272
(Continued)

(56) References Cited

U.S. PATENT DOCUMENTS 2,573,378 A 10/1951 Zurlinden
2,661,870 A 12/1953 Huenergardt
(Continued)

FOREIGN PATENT DOCUMENTS

CN 101623162 1/2010
JP S6235952 3/1987
(Continued)

OTHER PUBLICATIONS

International Search Report and Written Opinion, as issued in connection with International Patent Application No. PCT/US2015/011775, dated May 4, 2015, 10 pgs.
(Continued)

*Primary Examiner* — Robert J Hicks
(74) *Attorney, Agent, or Firm* — Maschoff Brennan; Paul G. Johnson

(57) ABSTRACT

A closure for a lid that has at least one opening may include an activator pivotally coupled to the lid, a cover pivotally coupled to the lid, and a connecting member pivotally coupled to the activator and the cover. The activator, the cover and the connecting member may form an over center latching mechanism. In addition, the activator may be pivotally connected to the lid about a first axis of rotation, the cover may be pivotally connected to the lid about a second axis of rotation, the connecting member may pivotally connected to the activator about a third axis of rotation, and the connecting member may be pivotally connected to the cover about a fourth axis of rotation. The distance between the first and second axes of rotation may be constant, and the distance between the third and fourth axes of rotation may change as the cover is moved.

20 Claims, 23 Drawing Sheets

Related U.S. Application Data continuation-in-part of application No. 29/479,736, filed on Jan. 19, 2014, now Pat. No. Des. 748,430, and a continuation-in-part of application No. 29/479,737, filed on Jan. 19, 2014, now Pat. No. Des. 745,827.

(60) Provisional application No. 61/929,081, filed on Jan. 19, 2014, provisional application No. 61/944,536, filed on Feb. 25, 2014, provisional application No. 62/004,673, filed on May 29, 2014.

(51) Int. Cl.
*B65D 43/16* (2006.01)
*B65D 43/26* (2006.01)
*B65D 47/06* (2006.01)
*A47J 43/27* (2006.01)
*A47J 43/10* (2006.01)
*B65D 45/16* (2006.01)
*B65D 47/08* (2006.01)
*B65D 51/18* (2006.01)

(52) U.S. Cl.
CPC ............ *B65D 25/28* (2013.01); *B65D 43/16* (2013.01); *B65D 43/26* (2013.01); *B65D 45/16* (2013.01); *B65D 47/06* (2013.01); *B65D 47/0866* (2013.01); *B65D 51/18* (2013.01); *B65D 2251/009* (2013.01); *B65D 2251/0021* (2013.01); *B65D 2251/0025* (2013.01); *B65D 2251/0028* (2013.01); *B65D 2251/0081* (2013.01); *B65D 2251/0087* (2013.01); *B65D 2525/283* (2013.01); *B65D 2543/00046* (2013.01); *B65D 2543/00231* (2013.01)

(58) Field of Classification Search
USPC ......... 220/254.5, 254.3, 254.1, 259.1, 256.1, 220/705, 212.5, 212; 215/229, 228, 243, 215/237, 235, 239; 222/469, 465.1, 556, 222/544, 568, 567, 566
See application file for complete search history.

(56) References Cited

U.S. PATENT DOCUMENTS

| | | |
|---|---|---|
| 2,678,758 A | 5/1954 | Richmond |
| 3,269,389 A | 8/1966 | Meurer et al. |
| 3,288,344 A | 11/1966 | Wollen et al. |
| 3,469,747 A | 9/1969 | Richmond |
| 3,770,160 A | 11/1973 | Flider |
| 4,065,024 A | 12/1977 | Atwell |
| 4,491,251 A | 1/1985 | Pratz |
| 4,732,303 A | 3/1988 | Wang |
| 4,756,440 A | 7/1988 | Gartner |
| 4,805,790 A | 2/1989 | Leonetti et al. |
| 4,810,245 A | 3/1989 | Aagesen |
| 4,890,770 A | 1/1990 | Haga et al. |
| 4,948,009 A | 8/1990 | Sawatani |
| 5,209,909 A | 5/1993 | Siegel et al. |
| 5,232,110 A | 8/1993 | Purnell |
| 5,252,312 A | 10/1993 | Gentile et al. |
| 5,292,021 A | 3/1994 | Lyon |
| 5,295,609 A | 3/1994 | Robbins, III |
| 5,318,203 A | 6/1994 | Iaia et al. |
| 5,588,561 A | 12/1996 | Ness |
| 5,873,478 A | 2/1999 | Sullivan et al. |
| 6,079,586 A | 6/2000 | Hanneman |
| 6,213,339 B1 | 4/2001 | Lee |
| D490,653 S | 6/2004 | Kleckauskas et al. |
| 6,845,884 B2 | 1/2005 | Chan et al. |
| 6,913,777 B2 | 7/2005 | Rebhorn et al. |
| 6,981,962 B1 | 1/2006 | Lenkersdorf |
| 7,124,917 B2 | 10/2006 | Lee |
| D538,597 S | 3/2007 | Kim |
| 7,246,715 B2 | 7/2007 | Smith et al. |
| D623,017 S | 9/2010 | George |
| D626,837 S | 11/2010 | Meyers et al. |
| D626,838 S | 11/2010 | Meyers et al. |
| D643,245 S | 8/2011 | Minarsch |
| 8,146,770 B2 | 4/2012 | Newman |
| 8,297,462 B1 | 10/2012 | Joyce |
| D677,121 S | 3/2013 | Meyers et al. |
| D677,162 S | 3/2013 | Sharma et al. |
| D682,016 S | 5/2013 | Knight |
| D682,612 S | 5/2013 | Rzepecki |
| 8,485,378 B2 | 7/2013 | Zoss et al. |
| D688,520 S | 8/2013 | Lin |
| D691,849 S | 10/2013 | Cetera et al. |
| D696,551 S | 12/2013 | Meyers et al. |
| 8,602,238 B2 | 12/2013 | El-Saden et al. |
| 8,622,229 B2 | 1/2014 | Lane |
| 8,783,506 B2 | 7/2014 | Lee |
| D721,540 S | 1/2015 | Grcic |
| D725,436 S | 3/2015 | Miller |
| 9,078,535 B1 | 7/2015 | Buck |
| D745,827 S | 12/2015 | Sorensen et al. |
| 9,199,779 B2 | 12/2015 | Zoss et al. |
| D748,430 S | 2/2016 | Sorensen et al. |
| D748,478 S | 2/2016 | Sorensen et al. |
| 9,392,893 B2 | 7/2016 | Sorensen et al. |
| D768,491 S | 10/2016 | Sorensen et al. |
| D773,895 S | 12/2016 | Dai |
| D776,339 S | 1/2017 | Rutherford et al. |
| 9,622,605 B2 | 4/2017 | Buck |
| 9,718,582 B2 | 8/2017 | Hylton |
| 2002/0110622 A1 | 8/2002 | Lloyd et al. |
| 2002/0179604 A1 | 12/2002 | Germain et al. |
| 2003/0052126 A1 | 3/2003 | Zettle et al. |
| 2003/0102318 A1 | 6/2003 | Lee |
| 2004/0118847 A1 | 6/2004 | Giraud |
| 2008/0099514 A1 | 5/2008 | Carter |
| 2009/0283535 A1 | 11/2009 | Mesalic |
| 2010/0065588 A1 | 3/2010 | Brannon et al. |
| 2011/0017760 A1 | 1/2011 | Newman |
| 2012/0055818 A1 | 3/2012 | Zimmern |
| 2012/0187078 A1 | 7/2012 | El-Saden et al. |
| 2013/0062304 A1 | 3/2013 | Meyers et al. |
| 2013/0062351 A1 | 3/2013 | Meyers et al. |
| 2014/0048549 A1 | 2/2014 | Wille |
| 2015/0034673 A1 | 2/2015 | Hopkins et al. |
| 2016/0324344 A1 | 11/2016 | Sorensen et al. |

FOREIGN PATENT DOCUMENTS

| | | |
|---|---|---|
| JP | H03140128 | 6/1991 |
| JP | H05-22328 U | 3/1993 |
| JP | H11240549 | 9/1999 |
| JP | 2001233370 A | 2/2000 |
| JP | 2001233370 A | 8/2001 |
| JP | 2004-509814 A | 4/2004 |
| JP | 3875687 B2 | 1/2007 |
| JP | 2007-502758 A | 2/2007 |
| JP | 2007-521192 A | 8/2007 |
| KR | 20-0455016 Y1 | 8/2011 |

OTHER PUBLICATIONS

International Search Report and Written Opinion, as issued in connection with International Patent Application No. PCT/US2015/011777, dated May 8, 2015, 8 pgs.

International Search Report and Written Opinion, as issued in connection with International Patent Application No. PCT/US2015/011780, dated May 11, 2015, 11 pgs.

U.S. Office Action, as issued in connection with U.S. Appl. No. 14/598,075, dated Dec. 7, 2015, 16 pgs.

U.S. Notice of Allowance, as issued in connection with U.S. Appl. No. 14/598,075, dated May 11, 2016, 12 pgs.

U.S. Office Action, as issued in connection with U.S. Appl. No. 14/598,087, dated Jul. 23, 2015, 13 pgs.

U.S. Office Action, as issued in connection with U.S. Appl. No. 29/479P,736, dated Jun. 4, 2015, 8 pgs.

(56) References Cited

OTHER PUBLICATIONS

International Preliminary Report on Patentability from PCT/2015/011775, dated May 4, 2016.
International Preliminary Report on Patentability from PCT/2015/011777, dated May 8, 2016.
International Preliminary Report on Patentability from PCT/2015/011780, dated May 11, 2016.
KR Notice of Preliminary Rejection dated Jun. 20, 2017 as received Application No. 10/2016-7015156 (English Translation) 11 Pages.
AU Patent Re-Issued Examination Report No. 2 dated Sep. 18, 2017 as received in Application No. 2015206301, 5 Pages.
U.S. Office Action in U.S. Appl. No. 29/479,736 dated Jun. 4, 2015, 14 Pages.
Examination Report in Australian Patent Application No. 2015206301 dated Sep. 13, 2017, 3 pages.
Extended European Search Report dated Jul. 28, 2017 as received in Application No. 15737718.5, 7 Pages.
Chinese Office Action in Chinese Patent Application No. 201580004239.9 dated Feb. 4, 2017, 14 Pages.
Chinese Office Action in Chinese Patent Application No. 201580004707.2 dated Jan. 26, 2017, 14 Pages.
U.S. Office Action in U.S. Appl. No. 14/598,087, dated Oct. 26, 2016, 11 pages.
CA Examiners Report in Canadian Patent Application No. 2931104 dated Apr. 5, 2017, 3 pages.
U.S. Office Action in U.S. Appl. No. 14/598,087, dated May 18, 2017, 11 pages.
Chinese Office Action in Chinese Patent Application No. 2015800042399 dated Jan. 20, 2017, 2 pages.
U.S Office Action, as issued in connection with U.S. Appl. No. 14/598,075, dated Dec. 7, 2015, 16 pages.
Chinese Office Action in Chinese Patent Application No. 201580004707.2 dated Dec. 20, 2017.
Extended European Search Report dated Sep. 11, 2017 as received in Application No. 15737832.4, 7 pgs.
KR Notice of Preliminary Rejection dated Jan. 30, 2018 as received Application No. 10-2016-7015156, 15 pages. (English Translation).
JP Notification of Reasons for Refusal dated Mar. 6, 2018 as received in Application No. 2016-544086, 6 pages. (Machine Translation).
CA Examiners Report in Canadian Patent Application No. 2931104 dated Jan. 15, 2018, 4 pages.

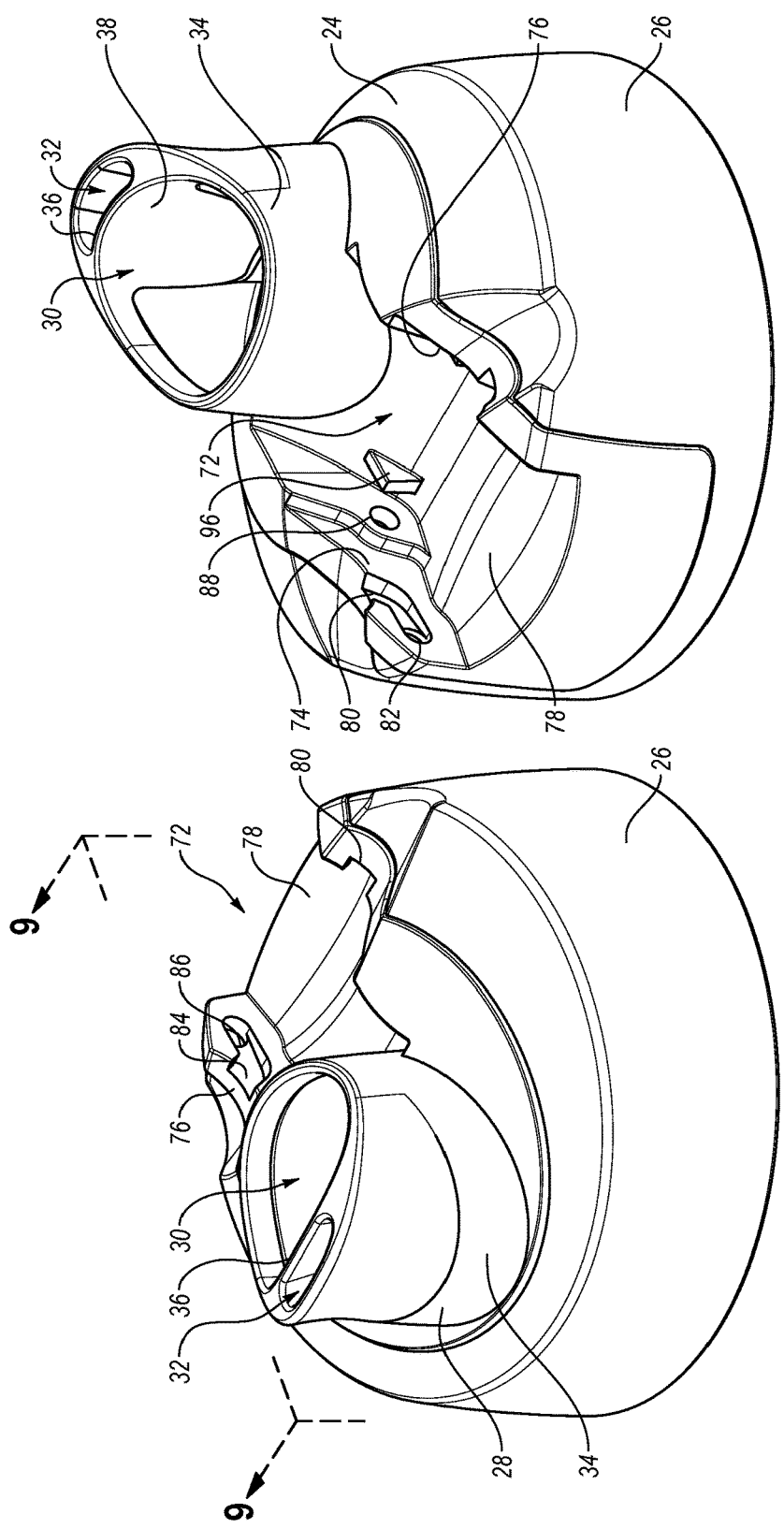

CLOSURE FOR AN OPENING IN A LID

CROSS-REFERENCE TO RELATED APPLICATIONS

This application is a continuation of U.S. patent application Ser. No. 14/598,075, filed Jan. 15, 2015, now U.S. Pat. No. 9,392,893, issued Jul. 19, 2016, which is hereby incorporated by reference in its entirety.

U.S. patent application Ser. No. 14/598,075, filed on Jan. 15, 2015, claims priority to and the benefit of U.S. Provisional Patent Application Ser. No. 61/929,081, entitled LID FOR A CONTAINER, which was filed Jan. 19, 2014; U.S. Provisional Patent Application Ser. No. 61/944,536, entitled OPENING FOR A CONTAINER, which was filed on Feb. 25, 2014; U.S. Provisional Patent Application Ser. No. 62/004,673, which was filed May 29, 2014; U.S. Design patent application Ser. No. 29/479,736, filed Jan. 19, 2014, now U.S. Pat. No. D748,430; and U.S. Design patent application Ser. No. 29/479,737, filed Jan. 19, 2014, now U.S. Pat. No. D745,827; each of which is hereby incorporated by reference in its entirety.

U.S. patent application Ser. No. 14/598,075, filed on Jan. 15, 2015, is also related to U.S. patent application Ser. No. 14/598,087, filed Jan. 15, 2015, entitled LID FOR A CONTAINER; and U.S. patent application Ser. No. 14/598,090, filed Jan. 15, 2015, entitled LID FOR A CONTAINER; each of which is hereby incorporated by reference in its entirety.

BACKGROUND

Field of the Invention

The present invention generally relates to lids and, in particular, to lids for containers.

Description of Related Art

Conventional containers may hold a variety of different types of liquids and fluids. For example, known containers can hold various drinks and beverages such as water, flavored waters, juices, energy drinks, protein-enhanced drinks, shakes, foodstuffs, and liquid meal replacements.

These types of known containers may be used in a wide variety of environments such as at a home, office, gym, or health club, and while traveling. Known beverage containers may also be used during or after activities such as exercising or riding in an automobile, bus, train, or airplane. Traditional beverage containers, such as a coffee mug, are generally unsuitable for drinking beverages while exercising or traveling because they can easily spill their contents, are often heavy, not readily portable, and are prone to breaking if dropped. Traditional beverage containers are also generally unsuitable for use outside of a limited area because they may be relatively inconvenient to carry or transport, and may allow the contents to spill.

Known beverage containers may include lids that are suitable for use while exercising or traveling. Consumers often fill such containers before exercising or traveling so the contents can be consumed before, during, or after exercising or traveling. These types of known beverage containers may include a container body for holding the beverage and a lid to prevent the contents from spilling.

Some known beverage containers may include a small cover over the drinking aperture to prevent the contents from spilling. The small cover is typically manually opened by the user's hand when the user desires to take a drink. For example, the user may slide the cover into an open position. Many of these known containers include a watertight or airtight seal between the cover and the drinking aperture to prevent the beverage from spilling. These known containers often require substantial effort to open and close the cover because the watertight or airtight seal must be formed or broken each time the cover is opened or closed. Some of these containers, especially when the container is full, may undesirably allow some of the beverage to spill when the cover is opened. In addition, because the cover may be suddenly and abruptly opened, this may cause some of the contents to spill. Further, these known beverage containers may be difficult for some consumers to use because a relatively large amount of force may be required to open or close the cover. Thus, some consumers may have substantial difficulty opening the cover. Additionally, the cover of some of these known containers may be difficult to securely close and that unfortunately may allow the contents to spill or leak.

Known beverage containers may also use a cover that rotates between an open and closed position. Disadvantageously, the cover may be difficult to open, close and/or rotate into the desired positions. Conventional beverage containers may also include a button or lever that must be depressed to open the cover and allow the beverage to be consumed. Some beverage containers undesirably require the button to be continuously depressed in order to drink from the container, which is often awkward and uncomfortable for the user.

Conventional beverage containers may also include rotating spouts and removable lids, but these types of devices are often difficult to open or close, especially for users with limited dexterity. In particular, it may be challenging or almost impossible for some users to rotate the spout from a closed position to an open position because of the difficulty in grasping the spout. It may also be problematic for many users to apply the force required to move the spout into the open position. Further, a user may not want to touch the spout with his or her fingers if their hands are dirty or unwashed. It may also be difficult for some users to remove the lid to allow access to the contents of the container. Further, it may be tedious to constantly remove the lid before drinking and this may prevent liquids from being consumed while exercising, traveling, during sporting events, or when a quick or rapid drink is desired.

In addition, known beverage containers may be difficult or inconvenient to use because the opening may not be the desired size. For example, the opening of some conventional containers may not allow sufficient fluid flow in some circumstances. On the other hand, the openings of some conventional containers may allow too much fluid flow and that may make it awkward to drink from the container.

Further, conventional beverage containers may have limited usefulness because they may only be used for specific purposes. Some conventional beverage containers may also be difficult to clean or reuse because of the shape, number of parts, and complex configuration of one or more components.

BRIEF SUMMARY OF THE INVENTION

A need therefore exists for a system or device which eliminates the above-described disadvantages and problems.

One aspect is a container that may hold or contain liquids, beverages, drinks, and the like. The container may be a shaker cup and the contents can be stirred, mixed, and/or blended as desired. This may allow protein drinks, shakes, smoothies, sauces, etc. to be created and/or stored within the container. The container could also be a water bottle in which water and other types of fluids can be transported and/or consumed such as flavored waters, juices, vitamin enhanced beverages, energy drinks, thirst-quenchers and the like. In addition, the container could hold mixtures and solutions, which could include vitamins, supplements, protein powders, etc. Further, the container could hold various powders, solids and/or other types of materials including foodstuffs such as fruits, vegetables, soups, dressings, and the like. If desired, the container may be insulated to help keep the contents at a desired temperature.

Another aspect is a lid that is preferably easily attached and removed from the container. In particular, the lid may be selectively attached to the container by a threaded or screw-type connection, which may allow the lid to be quickly secured to the container in a straightforward manner. The lid may also be attached to the container with a fluid or watertight seal, which may prevent the contents from leaking or spilling. The lid may cover a relatively large opening to allow the container to be easily filled, cleaned, and washed. While the lid is preferably selectively attached to the container, the lid could be permanently attached to the container.

Still another aspect is a lid that may include one or more openings and a closure that may allow or prevent fluid flow through one or more of the openings. For example, the closure can include an outwardly extending lever or handle and, when a user applies a force to the lever, the closure may be opened or closed with relatively little effort. In particular, the lever may provide a mechanical advantage so that a relatively small amount of force may be required to open or close the closure. Advantageously, a force on one side of the lever may open the closure and a force on the other side of the lever may close the closure. Thus, the closure may be simple and straightforward to use and operate.

Yet another aspect is a lid that may contain one or more spouts and one or more openings. If desired, one or more openings may be disposed within the spout. For example, the lid may include a spout and fluid may be easily poured or dispensed through an opening in the spout. The lid may also include an opening which may allow a user to drink from the container. If desired, a straw or other type of conduit may be used to facilitate drinking from the container. For example, a straw may be connected or inserted into the opening and a user may drink through the straw. These different types of openings may be disposed adjacent or proximate to each other, and these different types of openings may be disposed within a spout.

Advantageously, the two different types of openings may include one opening that allows the contents to be easily poured or dispensed from the container and another opening that allows a user to drink from the container. The dual openings may provide increased uses and/or flexibility because the different openings may have different sizes, shapes, configurations and/or arrangements, which may allow the openings to be used for different purposes. While the lid may be described below as including two openings, it will be appreciated after reviewing this disclosure that the lid may include any suitable number of openings including one or more. It will also be appreciated after reviewing this disclosure that the openings could have various shapes, sizes, configurations and arrangements depending, for example, upon the intended use of the container. Further, it will be appreciated that the openings could be used for similar or different purposes, and the multiple openings may increase the potential uses and functionality of the container.

Still yet another aspect is a lid for a container that includes a first opening and a second opening, and the openings may have different sizes and/or purposes. For example, one opening may be sized and configured to allow a user to pour from the container and the other opening may be sized and configured to allow a user to drink from the container. In greater detail, the lid may include one opening with a first size and another opening with a second size. The different sizes of the openings may allow fluids to flow through the openings at different rates. For instance, one opening may allow a relatively large volume of fluid to pass through the opening and the other opening may allow a smaller volume of fluid to pass through the opening. For example, one opening may be two, three, four, five, six or more times the size of the other opening. The different sizes may allow the openings to be used for different purposes. For instance, the larger opening may be used when a larger volume or flow rate of fluid is desired and the smaller opening may be used when a smaller volume or flow rate of fluid is desired. This may allow, for example, fluid to be poured through the larger opening and fluid to be sipped through the smaller opening.

In one exemplary embodiment, the lid may include one opening that is larger than another opening and the openings may have different configurations. For example, the larger opening may form a portion of a spout and may allow a large rate of fluid flow. The smaller opening may allow a user to sip from the opening and may allow a small rate of fluid flow. If desired, a straw may be connected to or inserted into the smaller opening. The openings may have numerous shapes such as circular, oval, round, oblong, curved, semi-circular, arc, rectangular, square, polygonal, and the like. In addition, the openings could have different shapes such as the larger opening could have a generally circular configuration and the smaller opening have an oblong, arc, curved or crescent shaped configuration.

A further aspect is a lid for a container that may include at least two openings and the openings may be disposed proximate or adjacent to each other. Thus, one opening may be disposed next to another opening. If desired, one opening may be at least partially disposed within another opening. For example, one opening may be at least partially surrounded, bounded, encircled or enclosed by another opening. The adjacent openings may be separated from another opening by a partition, wall or member. For instance, one opening may include an outer wall and a portion of the outer wall may form at least a portion of an adjacent opening. Therefore, the openings may share a common wall. While the openings may be disposed proximate or adjacent to each other, the openings may also be spaced apart. Advantageously, the different openings may provide different fluid pathways. For example, one opening may create a fluid pathway that allows a user to pour fluid from the container and the other opening may create a fluid pathway that allows a user to sip from the container, such as through a straw. Significantly, the different pathways may allow different fluid flow rates. In particular, the one flow rate may be much larger than a second flow rate.

Another further aspect is a lid for a container that may include a spout with a first opening or aperture and a second opening or aperture. For example, the spout may have a generally circular, oval or elongated outer configuration and two openings may be disposed in the spout. The first opening may have a generally circular configuration and a second opening may have a generally curved or arc-shaped configuration. The first opening may be at least adjacent to the second opening, and the openings may be separated by a partition or wall, which may define a portion of the first and/or second opening. The first and second openings may provide separate pathways into the container. For instance, the first opening may provide a first pathway into the container and the second opening may provide a second pathway into the container. In particular, the first opening may provide a direct opening to the container and the second opening may include or be selectively connected to a straw and the straw may provide a second pathway into the container. The different pathways may be in fluid communication with different portions of the container. In one example, the first pathway may be in fluid communication with a first portion of the container and the second pathway may be in fluid communication with a second portion of the container. It will be appreciated that the pathways could be in fluid communication with any desired portions of the container. It will also be appreciated that different pathways are not required and the openings may be in fluid communication with any desired portions of the container.

Still another further aspect is a lid that may include multiple openings and a straw may be selectively or permanently coupled to one or more of the openings. For example, a straw may be coupled to an opening, such as a smaller opening, and a user may drink through the straw. Significantly, this may allow a user to drink from the container using the straw and the other opening may allow the contents to be easily poured or dispensed from the container. As a result, a user may consume some or all of the contents from one or both of the openings. In addition, the openings may allow a user to sip or chug from the container depending upon the opening used. Further, the straw may allow a user to drink when the container is in a generally upright position. Alternatively, the container may be tilted or inverted to pour fluid out of the container.

Another aspect is a lid that may include a closure that provides controlled access to the contents of the container. In particular, the closure may provide controlled access to one or more openings so that the contents of the container are only accessed when desired. For instance, a closure may selectively cover or close one or more openings to control access to the contents of the container. Advantageously, the closure may cover multiple openings at one time, which may allow the container to be quickly and easily sealed. The closure may create a watertight seal to prevent the contents from leaking or spilling, which may facilitate transporting liquids and beverages, and may allow the container to be used before, during, or after activities such as exercising and/or traveling.

Still another aspect is a lid that may include a closure that is movable between open and closed positions. The closure, for example, may be pivotally attached to the lid and the closure may pivot between open and closed positions. In particular, one portion of the closure may be pivotally attached to a first portion of the lid and another portion of the closure may be pivotally attached to a second portion of the lid. In greater detail, the first portion of the closure may include an activator or handle that facilitates opening and closing the closure, and this first portion of the closure may be pivotally connected to a first portion of the lid. A second portion of the closure may include a cover or cap that is sized and configured to prevent fluid flow through the one or more openings when the closure is closed. The second portion of the closure may be pivotally connected to a second portion of the lid. The first and second portions of the closure may be pivotally attached to the lid in fixed positions, which may help create a consistent, reliable seal. In addition, when the closure is in the closed position, a force or other intentional act may be required to open the closure, which may help prevent unintended opening of the closure.

Yet another aspect is a lid that may include a connecting member. The connecting member may connect the first and second portions of the closure and the connecting member may bend, fold or elongate as the closure is opened and closed. The connecting member may allow the closure to be easily and smoothly opened and/or closed. Significantly, the closure may be opened or closed with relatively little force or pressure, which may allow the container to be used by a wide range of users and increase the number of people that can use the container. For example, the closure may allow a user to hold the container with one hand and use his or her thumb or finger on that hand to open or close the closure. It will be appreciated that the closure can be opened and closed by two hands or more than one user if desired.

Still yet another aspect is a lid for a container that may include a closure with an activator that is rotatably attached to the lid along a first axis of rotation. The activator may be movable between first and second positions, and the activator may include an outwardly extending portion, such as a lever or handle, that facilitates movement of the activator between the first and second positions. In the closed position, the activator may be extend generally upwardly and be at least substantially disposed within a circumference or outer perimeter of the lid. When the activator is in the open position, at least a portion of the activator may extend beyond the circumference or outer perimeter of the lid and another portion of the activator (such as a body) may extend upwardly and at an angle relative to the upper surface of the lid. While the activator may be pivotally disposed in a fixed position proximate an outer edge or perimeter of the lid, the activator could also be spaced inwardly and the activator does not have to be pivotally attached to the lid in a fixed position.

A further aspect is a lid for a container that may include a closure with an activator, connecting member and cover or cap. For example, the activator may be pivotally connected to a first portion of the lid along a first axis of rotation and the cover may be pivotally connected to a second portion of the lid along a second axis of rotation. In addition, one end of the connecting member may be attached to the activator and the other end of the connecting member may be attached to the cover. In particular, one end of the connecting member may be pivotally attached to the activator and the other end of the connecting member may be pivotally attached to the cover. Thus, the closure may include four pivot points and the pivot points may be aligned along four different axes of rotation, and the axes of rotation may be disposed in a generally parallel configuration. Additionally, the distance between the four pivot points or axes of rotation may be fixed or varied. For example, the distance between the pivot points or axes of rotation of the connection of the activator to the lid and the cover to the lid may be fixed. The distance between the connection of the activator to the lid and connection of the activator to the connecting member may also be fixed. Further, the distance between the connection of the cover to the lid and the connection of the cover to the connecting member may be fixed. The distance between the connection of the connecting member to the activator and the connection of the connecting member to the cover may vary.

In greater detail, the connecting member may be connected to the activator so that when the activator moves, the connecting member also moves and the movement of the connecting member may cause the cover to move. For instance, as the activator is moved from a closed to an open position, a force may be applied to the connecting member and the connecting member may open the cover. When the activator is moved from the open to the closed position, the activator may apply a force on the connecting member and the connecting member may close the cover. The movement of the connecting member may be at least partially controlled by a guide. The connecting member may be at least partially disposed between one or more flanges or protrusions and these structures may help guide or control the movement of the connecting member. It will be understood, after reviewing this disclosure, that one or more protrusions, projections, pins, openings, channels, grooves and the like may also be used to guide or control the movement of the activator, cover and/or connecting member.

Another further aspect is a lid for a container that may include a connecting member that may be changeable in length. For instance, the connecting member may be expandable in length and the connecting member may be biased into one or more configurations. In particular, the connecting member may include a biasing or expandable portion that allows the length of the connecting member to change and the biasing portion may bias the connecting member into one or more desired configurations. For example, the connecting member may be constructed from a resilient, bendable and/or flexible material, such as plastic, and it may include a biasing or expandable portion with a generally V-shaped configuration. When a force is applied in one direction to the connecting member, such as along a length of the connecting member, the expandable portion may allow the overall length of the connecting member to be decreased. When the force is removed or a force in an opposing direction is applied, the expandable portion may allow the overall length of the connecting portion to be increased. The different lengths of the connecting member may account for the different distances between the connection of the connecting member to the activator and the cover. In addition, the connecting member may have sufficient stiffness and rigidity that when an opening force is applied to the activator and the activator is moved from a closed position to an open position, the connecting member may cause the cover to rotate and expose one or more openings. The connecting member may also provide sufficient force on the cover when the activator is being closed to cover the openings. Advantageously, because the activator may act as a lever, a relatively small force may be applied to the activator but a larger, more considerable force may be applied to the cover by the connecting member. This may allow the closure to be relatively easily opened and/or closed. Additionally, because the connecting member may help control the amount of force applied to the closure, this may facilitate smooth, relatively effortless opening and closing of the closure.

Still another further aspect is a lid for a closure that may include multiple pivot points. The pivot points may be formed by protrusions, projections, pins or other types of outwardly extending portions that are disposed in openings, apertures, recesses or other types of receiving structures. For example, the lid may include a first set of protrusions that allow the activator to be pivotally connected to the lid and a second set of protrusions that allow the cover to be pivotally connected to the lid. The first and second sets of protrusions may be disposed in a parallel configuration and spaced apart by a constant distance. One end of the connecting member may be connected to the activator by a third set of protrusions and the other end of the connecting member may be connected to the cover by a fourth set of protrusions.

Yet another further aspect is a lid for a closure that may include four axes of rotation. For example, the activator may be pivotally connected to the lid at a first axis of rotation and the cover may be pivotally connected to the lid at a second axis of rotation. The connecting member may be pivotally connected to the activator at a third axis of rotation and the connecting member may be pivotally connected to the cover at a fourth axis of rotation. Thus, the cover may include four pivot points or four axes of rotation. While the distance between the first and second axes of rotations may be fixed, the distance between the third and fourth axes of rotation may vary. For example, the distance between the third and fourth axes of rotation may increase or decrease as the closure is opened and closed. In addition, a first distance may separate the connection of the activator to the lid and the activator to the connecting member, and a second distance may separate the connection of the cover to the lid and the cover to the connecting member. Because the first and second distances may be different and/or the activator and cover may be connected to different portions of the lid, the connection of the connecting member to the activator and the connection of the connecting member to the cover may move along different paths. For example, the connection of the connecting member to the activator may move along a first arc or curve relative to the lid and the connection of the connecting member to the cover may move along a second arc or curve relative to the lid.

Another aspect is a lid for a container that may be easily opened and closed. For example, in order to access the contents of the container, a user may depress or apply a force to an activator and that may cause the closure to move. In particular, the force applied to the activator may cause the activator to rotate around an axis of rotation and apply a force to the connecting member. The connecting member may then apply a force to the cover and that may cause the cover to rotate about an axis of rotation and open. A force may also be applied to the activator to close the cover. For instance, a user may apply a force on the activator, which applies a force to the connecting member, and this applies a force on the cover. Specifically, the force applied to the activator may rotate the activator and apply a corresponding force on the connecting member. The connecting member then applies a force on the closure that causes the closure to rotate into a closed position. This structure may create a mechanical advantage that facilitates opening and/or closing of the closure.

Still another aspect is a lid for a container that may include a handle. For instance, at least a portion of the activator may form at least a portion of the handle. In one exemplary embodiment, the handle may include one or more surfaces that are contoured to facilitate holding the container and/or use of the activator. For example, the activator may include curved surfaces, such as a depression or engaging portion, which may be sized and configured to allow a user to apply a force to the activator and/or carry the container. The handle could also have a loop-shaped configuration and a portion of the activator could form the handle. It will be appreciated, in view of this disclosure, that the activator and handle may have various suitable shapes, sizes, configurations and arrangements depending, for example, upon the intended use of the container.

Yet another aspect is a lid for a container that may include an over center latching mechanism. The over center latching mechanism may, for example, include an activator, cover and connecting member. The connecting member, which may be a spring or have spring-like properties, may be pivotally connected to the activator and cover. When the activator is moved from the closed to an open position, the connecting member may resist movement until the distance between the connection of the connecting member to the activator and the connection of the connecting member to the closure reaches its smallest distance (which may be referred to as its center point). Once the activator moves past the center point, then the activator may be more freely moved and the closure may be easily opened. When the activator is moved from the open to a closed position, a force must be applied to the activator that allows the center point to be reached. Because the activator may include a handle or lever, a significant amount of force may be applied to overcome a biasing force of the connecting member. As the activator continues to move towards the closed position, the connecting member may move past the center point and then the cover may close the one or more openings in the lid. Advantageously, in this position, the connecting member may securely hold the closure in the closed position. Moreover, because the closure may exert significant force in the closed position, fluid may not leak out. Because a significant amount of force may be required to compress the connecting member, the closure may be securely held in the closed position and the closure may snap or lock as the closure is being moved into the closed position.

A further aspect is a lid for a container that may be constructed from plastic, metal, a combination or plastic and metal, or other materials with suitable characteristics and properties. The lid may be attached to containers made from plastic, glass, metal and the like. Advantageously, the lid may be constructed from relatively few parts that may be quickly and efficiently manufactured. For example, in an exemplary embodiment, the lid may include a closure with an activator, connecting member and cover. In another exemplary embodiment, the lid may include a body, a spout and multiple openings in the spout. One of ordinary skill in the art, after reviewing this disclosure, will appreciate that the lid can include any suitable number of parts and components. One of ordinary skill in the art, after reviewing this disclosure, will also appreciate that the lid could have other appropriate shapes, sizes, configurations and arrangements depending, for example, upon the intended use of the container. Further, one of ordinary skill in the art, after reviewing this disclosure, will appreciate that the lid may include any suitable number of openings and the openings could have different shapes, sizes, configurations and arrangements depending, for example, upon the intended use of the container.

Another aspect is a closure for a lid may include a lid, at least one opening in the lid, and a closure sized and configured to control access to the at least one opening. The closure may include an activator pivotally coupled to the lid; a cover pivotally coupled to the lid, the cover movable between an open position and a closed position; and a connecting member coupled to the activator and the cover, the actuator may be movable between a first position that closes the cover and a second position that opens the cover; the cover in the closed position may be sized and configured to prevent fluid flow through the one or more openings; and the cover in the open position may be sized and configured to allow fluid flow through the one or more openings. If desired, the activator, the cover and the connecting member may comprise an over center latch mechanism.

In greater detail, the activator may be pivotally connected to the lid about a first axis of rotation, the cover may be pivotally connected to the lid about a second axis of rotation, the connecting member may be pivotally connected to the activator about a third axis of rotation, and the connecting member may be pivotally connected to the cover about a fourth axis of rotation. The first axis of rotation may be disposed in a first fixed position relative to the lid and the second axis of rotation may be disposed in a second fixed position relative to the lid. The distance between the third axis of rotation and the fourth axis of rotation may change as the cover is moved between the open and closed positions. And when a force applied to the activator is sufficient to compress the connecting member, the cover can be moved from the closed position to the open position. In addition, the activator may include an outwardly extending handle. Additionally, the connecting member may provide a spring force and movement of the cover between the open and closed positions may require sufficient force applied to the activator to overcome the spring force. Further, the over center latch mechanism may lock the cover in the closed position.

Still another aspect if the closure may include a biasing mechanism that allows a length of the connecting member to change as the activator moves between the first and second positions. If desired, the biasing mechanism may bias the cover in the closed position when the activator is in the first position. A force applied to the activator may overcome a biasing force of the biasing mechanism to allow the activator to be moved from the first position to the second position and the cover to be moved from the closed position to the open position. Additionally, the closure may be an over center latching mechanism, an amount of force applied to the activator may be sufficient to allow the activator to rotate past a center point of the over center latching mechanism to allow the activator to move from the first position to the second position and to dispose the cover in the open position, and an amount of force applied to the activator may be sufficient to allow the activator to rotate past the center point of the over center latching mechanism to allow the activator to move from the second position to the first position and the biasing mechanism of the connecting member applies to a force to the cover and the activator to secure the cover in the closed position.

Yet another aspect is a closure for a lid may include a lid, one or more openings in the lid, and a closure coupled to the lid, the closure may be movable between a first position and a second position. The closure may include an activator; a cover movable between an open position and a closed position; and a connecting member connected to the activator and the cover, the activator, the cover and the connecting member forming an over center latching mechanism. The cover in the closed position may prevent fluid flow through at least one opening of the one or more openings in the lid. The cover in the open position may allow fluid flow through at least one opening of the one or more openings in the lid.

In greater detail, the one or more openings in the lid may consist of a single opening in the lid, the cover may prevent fluid flow through the single opening in the lid in the closed position, and the clover may allow fluid flow through the single opening in the lid in the open position. In addition, the one or more openings in the lid consists of two openings in the lid, the cover may prevent fluid flow through at least one of the two openings in the lid in the closed position, and the clover may allow fluid flow through the two openings in the lid in the open position. Additionally, the one or more openings in the lid may consist of two openings in the lid, and the cover may close at least one of the openings in the closed position.

If desired, the activator may be pivotally connected to the lid about a first axis of rotation, the cover may be pivotally connected to the lid about a second axis of rotation, the connecting member may be pivotally connected to the activator about a third axis of rotation, and the connecting member may be pivotally connected to the cover about a fourth axis of rotation. The first axis of rotation may be disposed in a first fixed position relative to the lid and the second axis of rotation is disposed in a second fixed position relative to the lid. The distance between the third axis of rotation and the fourth axis of rotation may change as the cover is moved between the open and closed positions. Additionally, a biasing mechanism may allow a length of the connecting member to change as the activator moves between the first and second positions. The biasing mechanism may also bias the cover in the closed position when the activator is in the first position. Further, an amount of force applied to the activator may be sufficient to allow the activator to rotate past a center point of the over center latching mechanism to allow the activator to move from the first position to the second position and to dispose the cover in the open position; and an amount of force applied to the activator may be sufficient to allow the activator to rotate past the center point of the over center latching mechanism to allow the activator to move from the second position to the first position and to secure the cover in the closed position.

Still yet another aspect is an over center latching mechanism that may be sized and configured to control access to a fluid disposed within a container. The over center latching mechanism may include a lid, at least one opening in the lid, and a closure coupled to the lid. The closure may include an activator pivotally connected to the lid about a first axis of rotation; a cover pivotally connected to the lid about a second axis of rotation, the cover movable between an open position and a closed position; and a connecting member including a first end pivotally connected to the activator about a third axis of rotation and a second end pivotally connected to the cover about a fourth axis of rotation, the connecting member providing a force that must be overcome to move the cover between the open and closed positions. The first axis of rotation may be disposed in a first fixed position relative to the lid and the second axis of rotation is disposed in a second fixed position relative to the lid; and a distance between the third axis of rotation and the fourth axis of rotation may change as the cover is moved between the open and closed positions.

These and other aspects, features, and advantages of the present invention will become more fully apparent from the following brief description of the drawings, the drawings, the detailed description of preferred embodiments, and appended claims.

BRIEF DESCRIPTION OF THE DRAWINGS

The appended drawings contain figures of preferred embodiments to further illustrate and clarify the above and other aspects, advantages, and features of the present invention. It will be appreciated that these drawings depict only preferred embodiments of the invention and are not intended to limits its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

FIG. 3 is an enlarged front, upper perspective view of a portion of the lid shown in FIG. 1;

FIG. 4 is an enlarged rear, upper perspective view of a portion the lid shown in FIG. 1;

DETAILED DESCRIPTION OF THE PREFERRED EMBODIMENTS

Figure 1:
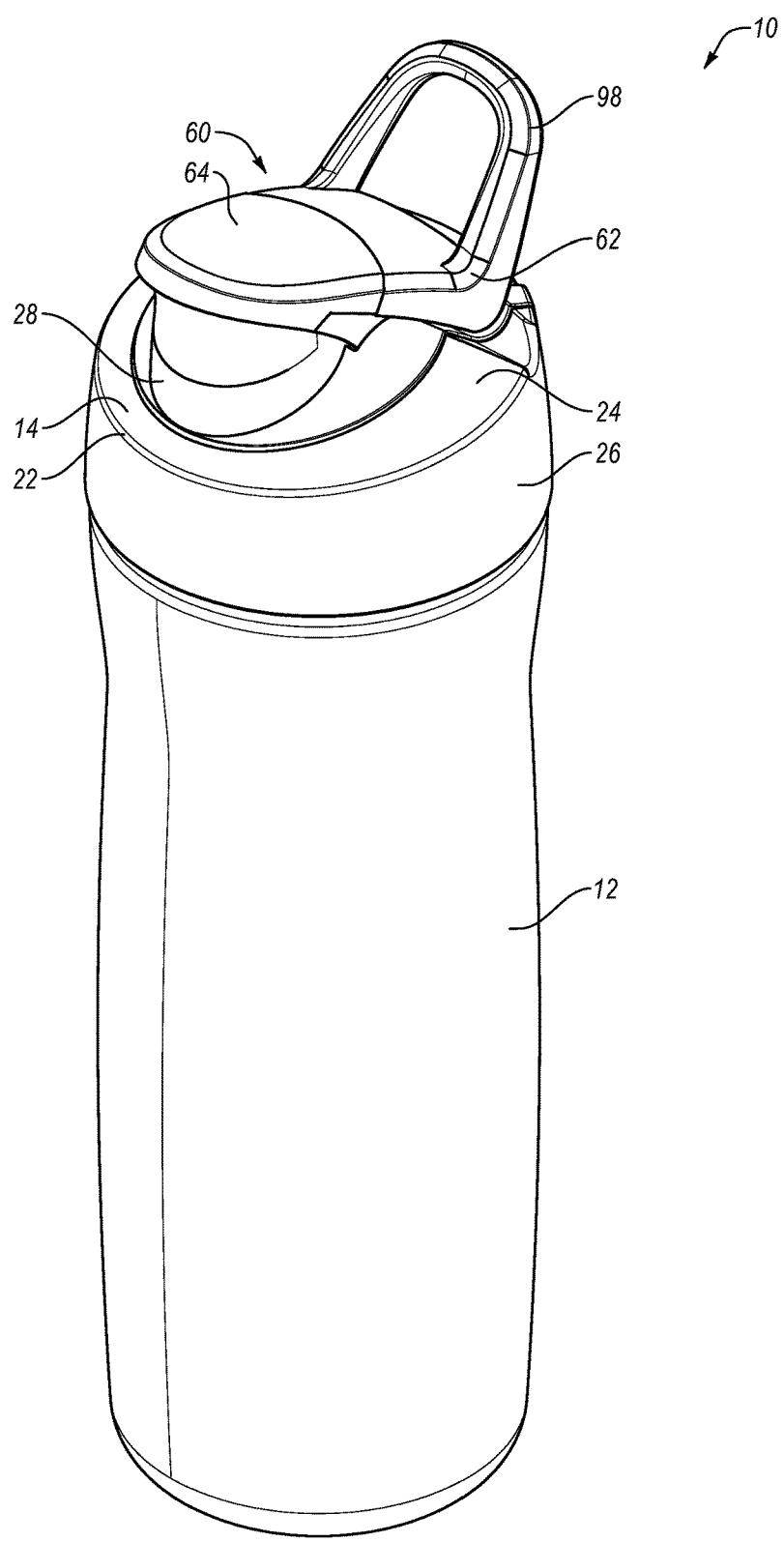
FIG. 1 is a front, upper perspective view of an exemplary container and lid, illustrating the lid in a closed position.

The present invention is generally directed towards a lid for a container. The principles of the present invention, however, are not limited to lids for containers. It will be understood that, in light of the present disclosure, the lids and containers disclosed herein may have a variety of shapes, sizes, configurations, and arrangements. It will also be understood that lids and containers may include any suitable number and combination of features, components, aspects, and the like. In addition, while the lids and containers shown in the accompanying figures are illustrated as having particular styles and configurations, it will be appreciated the lids and containers may have any suitable style or configuration. Further, the lids and containers disclosed herein may be successfully used in connection with other types of objects and devices.

Additionally, to assist in the description of various exemplary embodiments of the lids and containers, words such as top, bottom, front, rear, sides, right, and left are used to describe the accompanying figures which may be, but are not necessarily, drawn to scale. It will further be appreciated the lids and containers may be disposed in a variety of desired positions or orientations, and used in numerous locations, environments, and arrangements.

The accompanying figures show various exemplary lids and containers, and the lids and containers may be used independently and/or in combination. Thus, wording such as the lid system or the lid and container system may be used to refer to a lid, container, or a lid and a container. In addition, while the lid system may be described as including various features and aspects, the lid system may include any desired number and combination of features and/or aspects.

Briefly, the lid system may include a lid that can be selectively attached to the container and the lid may include one or more openings that provide access to the contents of the container. For example, the lid may include one opening that allows the contents of the container to be poured or rapidly dispensed and another opening that allows a user to sip fluids from the container through a straw. The two openings may be disposed proximate or adjacent to each other, and the openings may be separated by a common wall. The openings may provide different fluid pathways and/or different ways in which fluid can be dispensed. The lid may also include a closure. For example, when the closure is in a closed position, fluid may not be able to flow through the one or more openings. On the other hand, when the closure is in an open position, fluid may be able to flow though one or more openings. The closure may be pivotally attached to the lid and the closure may include an activator and/or a handle that allows the closure to be conveniently and easily opened and closed. A detailed description of exemplary embodiments of the lid and container system now follows.

Please note that multiple exemplary embodiments are disclosed and described in detail below. The same reference numbers may be used in connection with similar parts, components, and features in the different embodiments for ease and convenience of the reader. It will be understood that different embodiments may have different parts, components, features and aspects; and the different parts, components, features and aspects may not be required. Further, it will be understood that different systems may include various combinations of these parts, components, features and aspects depending, for example, upon the intended use of the system.

As seen in FIG. 1, an exemplary embodiment of a lid system 10 may include a container 12 and a lid 14. The container 12 may have different shapes, sizes, configurations, and arrangements depending, for example, upon the intended use of the lid system 10. The container 12 may be made of plastic, glass, metal, and the like.

The container 12 may be sized and configured to hold, retain and/or store one or more liquids and/or solids. In particular, the container 12 may be a vessel or bottle and the container may be used to store liquids such as water, flavored water, vitamin enhanced water, and the like. The container 12 may also store fluids and solutions such as juices, energy drinks, thirst-quenchers, and other types of beverages. The container 12 can also be used to store solids such as powders, concentrates, mixes, and foodstuffs.

The container 12 may be of any suitable size. For example, the container 12 can hold approximately 16, 18, 20, 22 or 24 ounces (or about 400, 500, 600, 700, 800, 900 ml or a liter). One of ordinary skill in the art will appreciate after reviewing this disclosure that the container 12 could have any suitable size, including smaller and larger sizes. In addition, while the container 12 is shown in the accompanying figures as having a generally cylindrical or tube-shaped configuration, the container may have other appropriate shapes and configurations. Further, the container 12 may be insulated to help keep the contents at a desired temperature.

The lid 14 may provide a cap or top to the container 12. For example, the lid 14 may cover a relatively large opening and the opening may allow the container 12 to be easily filled, cleaned, and washed. The lid 14 may be made of plastic, metal, a combination or plastic and metal, or other materials with suitable characteristics and properties.

Figure 2:
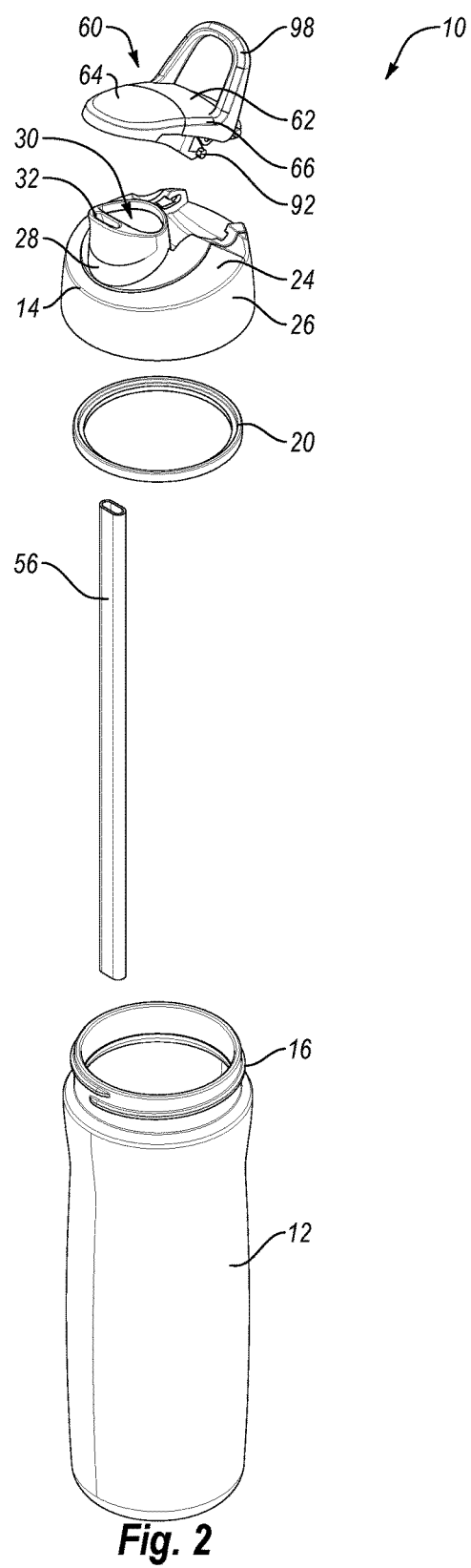
FIG. 2 is an exploded upper perspective view of the container and lid shown in FIG. 1.
Figure 6:
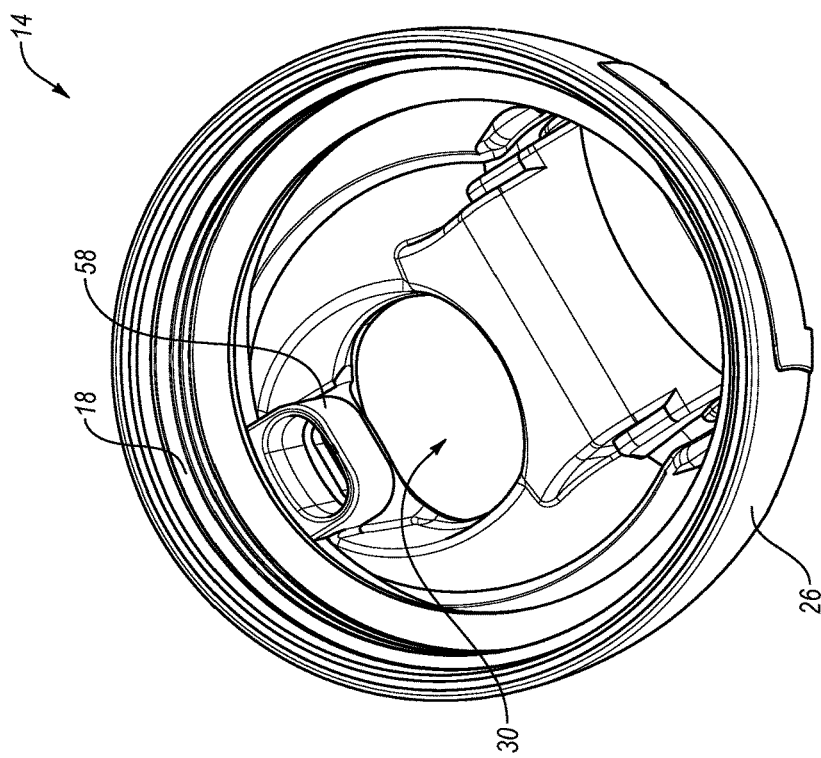
FIG. 6 is an enlarged lower perspective view of a portion of the lid shown in FIG. 1.
Figure 5:
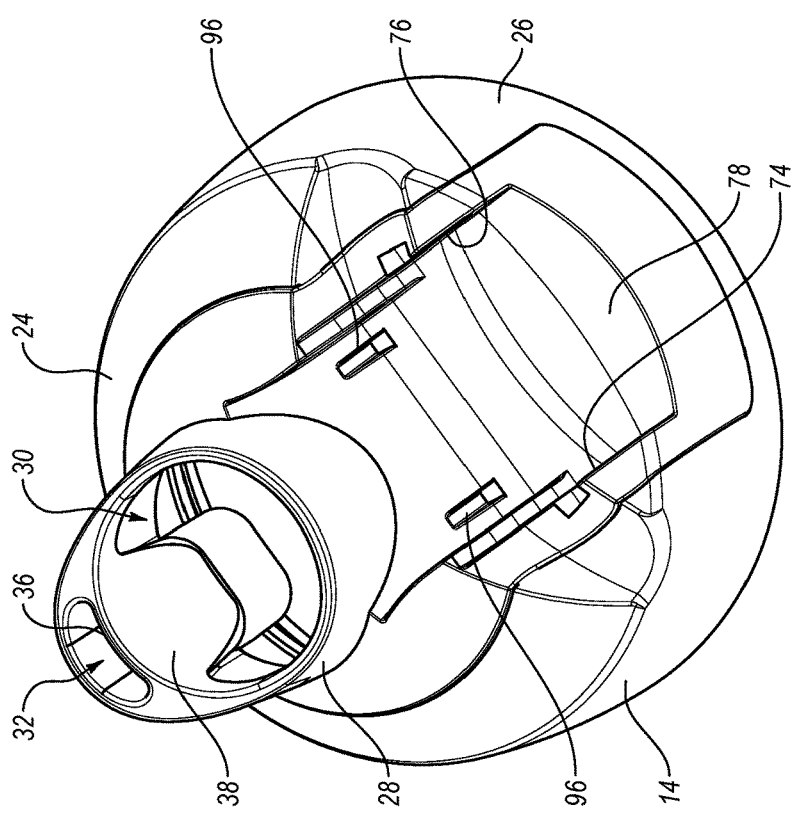
FIG. 5 is another enlarged rear, upper perspective view of a portion the lid shown in FIG. 1.
Figure 7:
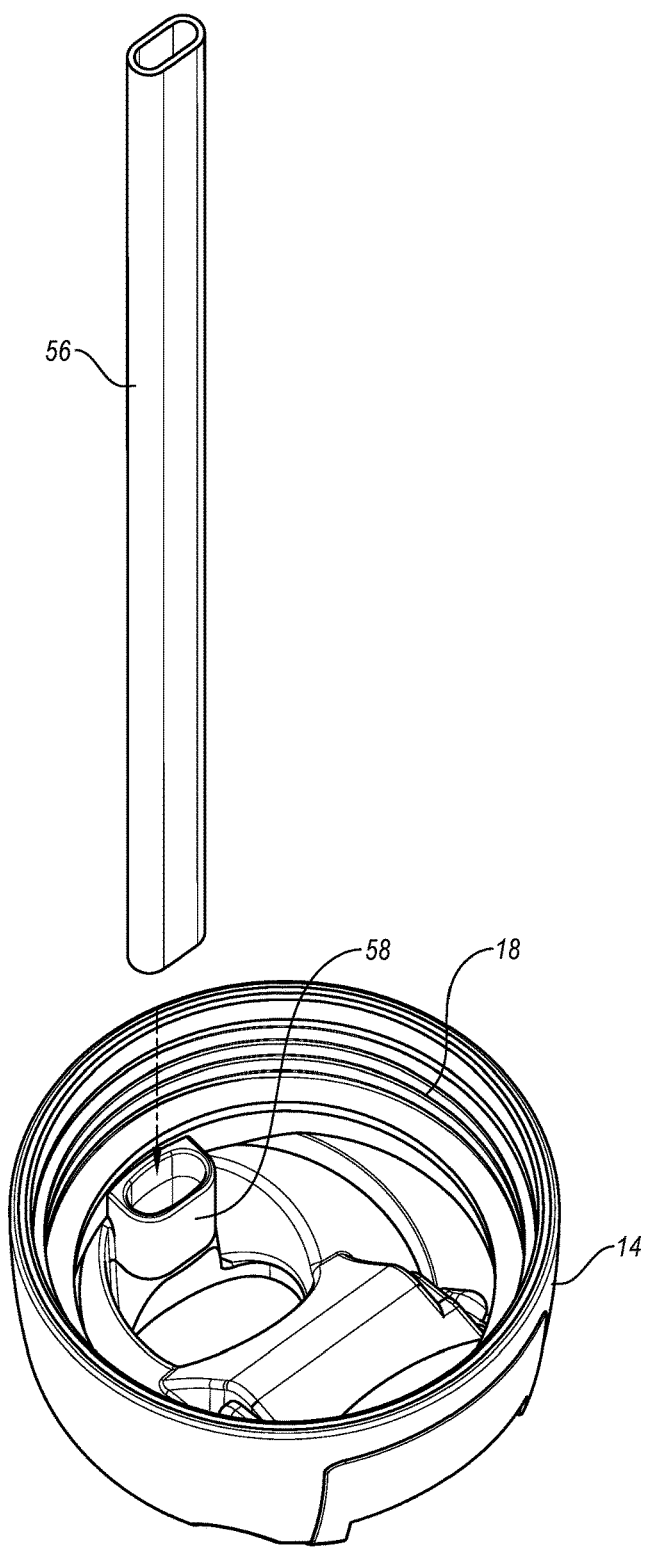
FIG. 7 is an enlarged, exploded, lower perspective view of a portion of the lid shown in FIG. 1, illustrating an exemplary straw.
Figure 8:
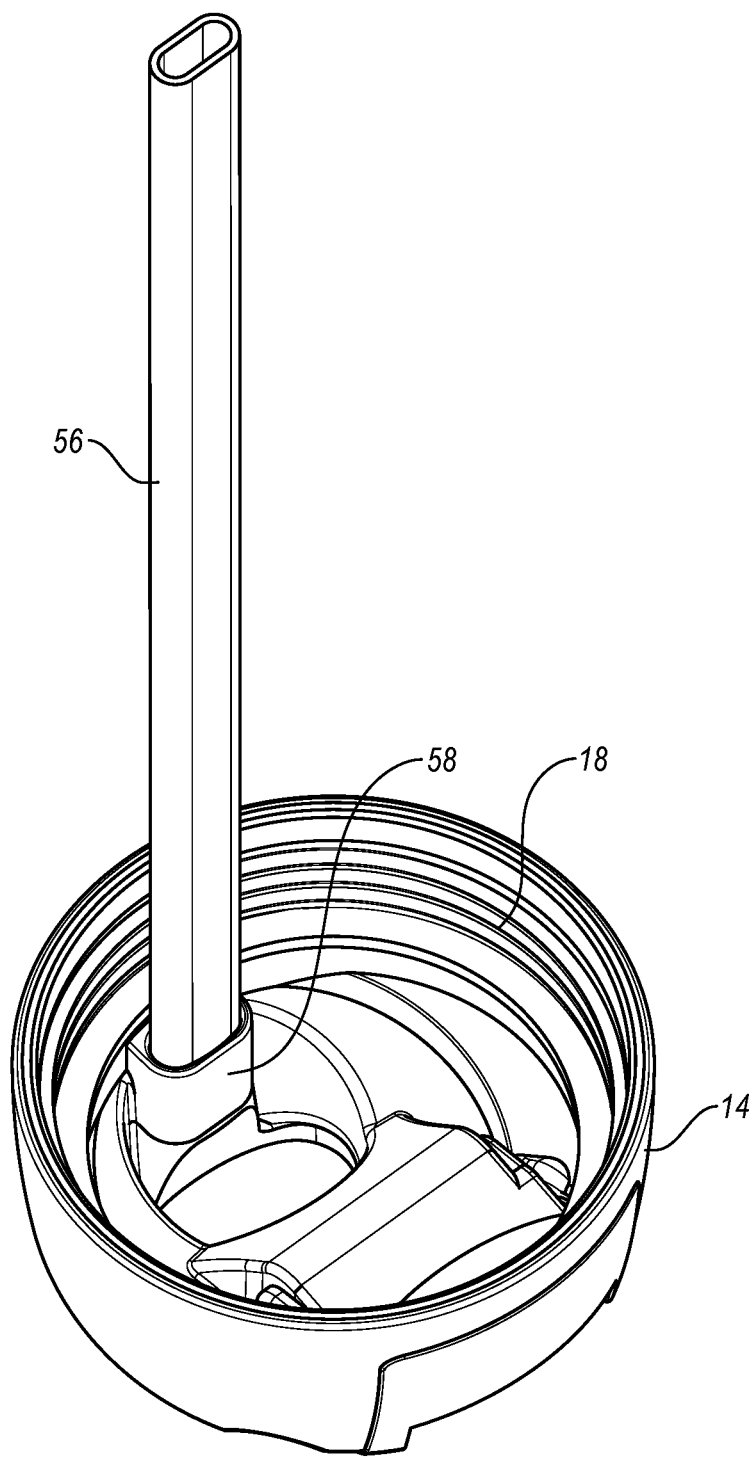
FIG. 8 is a lower perspective view of the lid and straw shown in FIG. 7, illustrating the straw connected to the lid.

The lid 14 is preferably removably connected to the container 12. The lid 14 may be removably connected to the container by threading, snapping, twisting, sliding, or screwing the lid 14 to the container 12. For example, as illustrated in FIG. 2, an upper, outer portion of the container 12 may include one or more threads 16 and an inner portion of the lid 14 may include one or more corresponding threads 18, such as illustrated in FIG. 6. The mating threads 16, 18 may allow the lid 14 to be selectively attached to the container 12. In addition, the threaded connection of the lid 14 to the container 12 may create a secure, airtight, watertight and/or leak-proof seal. A gasket 20 may be disposed between the lid 14 and the container 12, if desired, and the gasket may help create the seal between the lid and the container. The threaded connection may require multiple turns of the lid 14 relative to the container 12 to securely connect the lid to the container, but it will be appreciated that the lid may be connected to the container by one or fewer turns. The lid 14 may also be connected to the container 12 using other suitable types of connections and structures depending, for example, upon the intended use of the lid system 10.

The lid 14 may include a body 22 with an upper portion 24 and a sidewall 26, which may extend downwardly from the body. The upper portion 24 of the lid 14 may be curved or domed and the threads 18 may be disposed on an inner surface of the sidewall 26. The lid 14 may also include a spout 28, such as a tube or projection, and the spout may extend from the upper portion 24 of the lid. The spout 28 may allow fluids to be discharged from the container 12. The spout 28 may include one or more openings or apertures and the plurality of openings may provide access to the contents of the container 12. For example, as shown in FIGS. 2-18, the spout 28 may include a first opening 30 and a second opening 32 (an exemplary embodiment of a lid including a single opening is shown in FIGS. 19-27, which is discussed in detail below).

The first opening 30 may provide direct access to the contents of the container 12 and the contents of the container may be poured through the first opening. As shown in FIGS. 2-18, the first opening 30 may be larger than the second opening 32 and that may allow a larger rate of fluid flow through the first opening in comparison to the second opening. For instance, the first opening 30 may be two, three, four, five, six or more times the size of the second opening 32. It will be appreciated that the first opening 30 may be smaller than the second opening 32 and the openings may have various sizes depending, for example, upon the intended use of the lid system 10.

The first opening 30 may have a generally cylindrical configuration and the first opening may be at least partially defined by an outer wall 34 of the spout 28 as shown in FIGS. 3 and 4. For example, the first opening 30 may have a substantially circular cross-sectional configuration. The second opening 32 may be disposed proximate and/or adjacent to the first opening 30 and a wall 36, such as a partition or divider, may separate the openings. The wall 36, which may be referred to as a common wall, may form or define at least a portion of the first opening 30 and the second opening 32. Thus, the first opening 30 may be at least partially formed or defined by the outer wall 34 of the spout 28 and the common wall 36, and the second opening 32 may be at least partially formed or defined by the outer wall of the spout and the common wall. In greater detail, a first surface 38 of the common wall 36 may form or define a portion of the first opening 30 and a second surface 40 of the common wall may form or define a portion of the second opening 32. As illustrated in the accompanying figures, the second opening 32 may have a generally arc, curved or rounded configuration. For instance, the second opening may have a substantially arc-shaped cross-sectional configuration. The second opening 32 may at least partially encircle, enclose or circumscribe a portion of the first opening 30. It will be understood that the openings 30, 32 do not have to be formed or defined by the spout 28, the openings 30, 32 could be independent of the spout, and the spout is not required.

Figure 9:
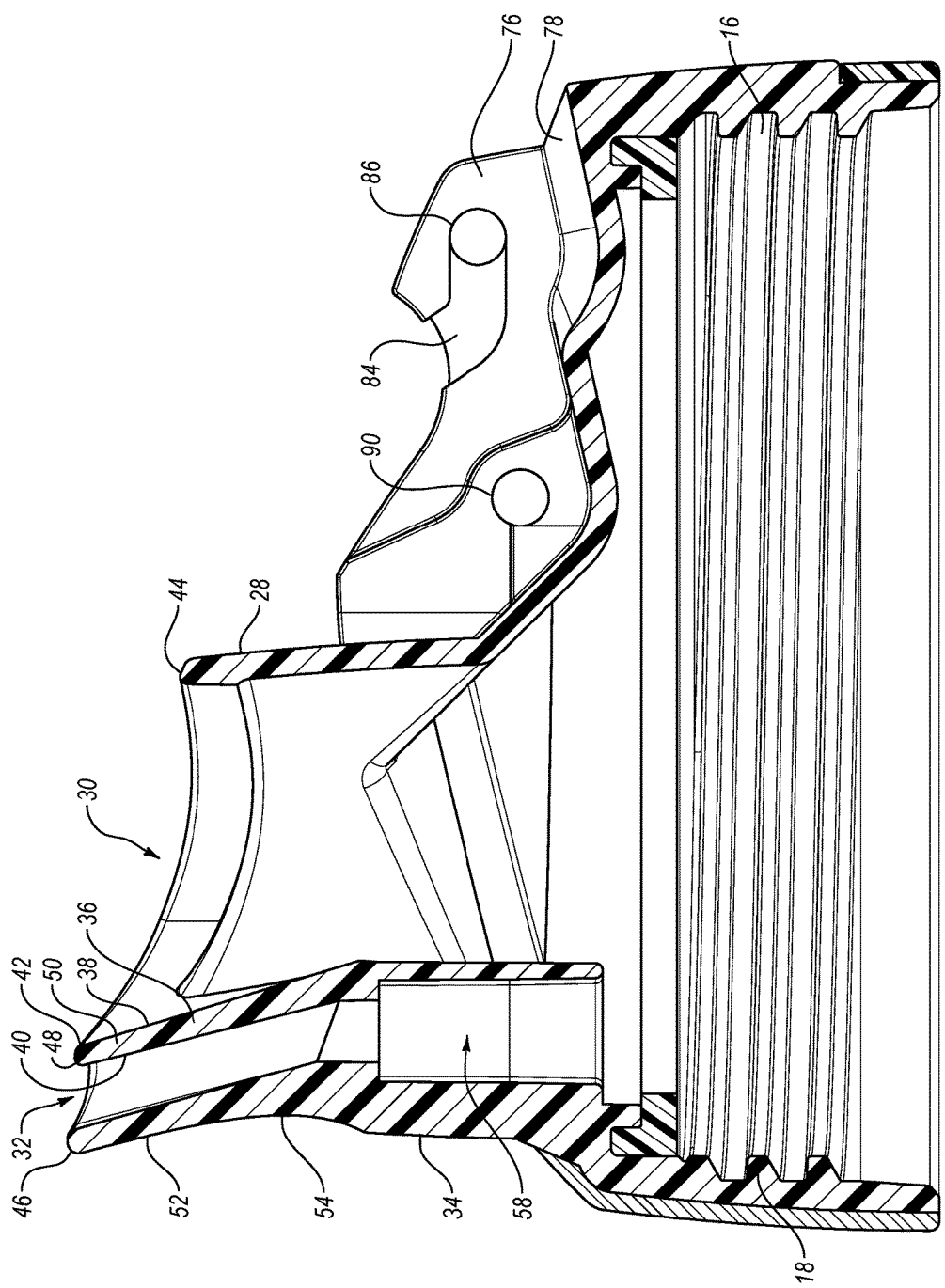
FIG. 9 is an enlarged cross-sectional side view of a portion of the lid shown along lines 9-9 in FIG. 3.
Figure 10:
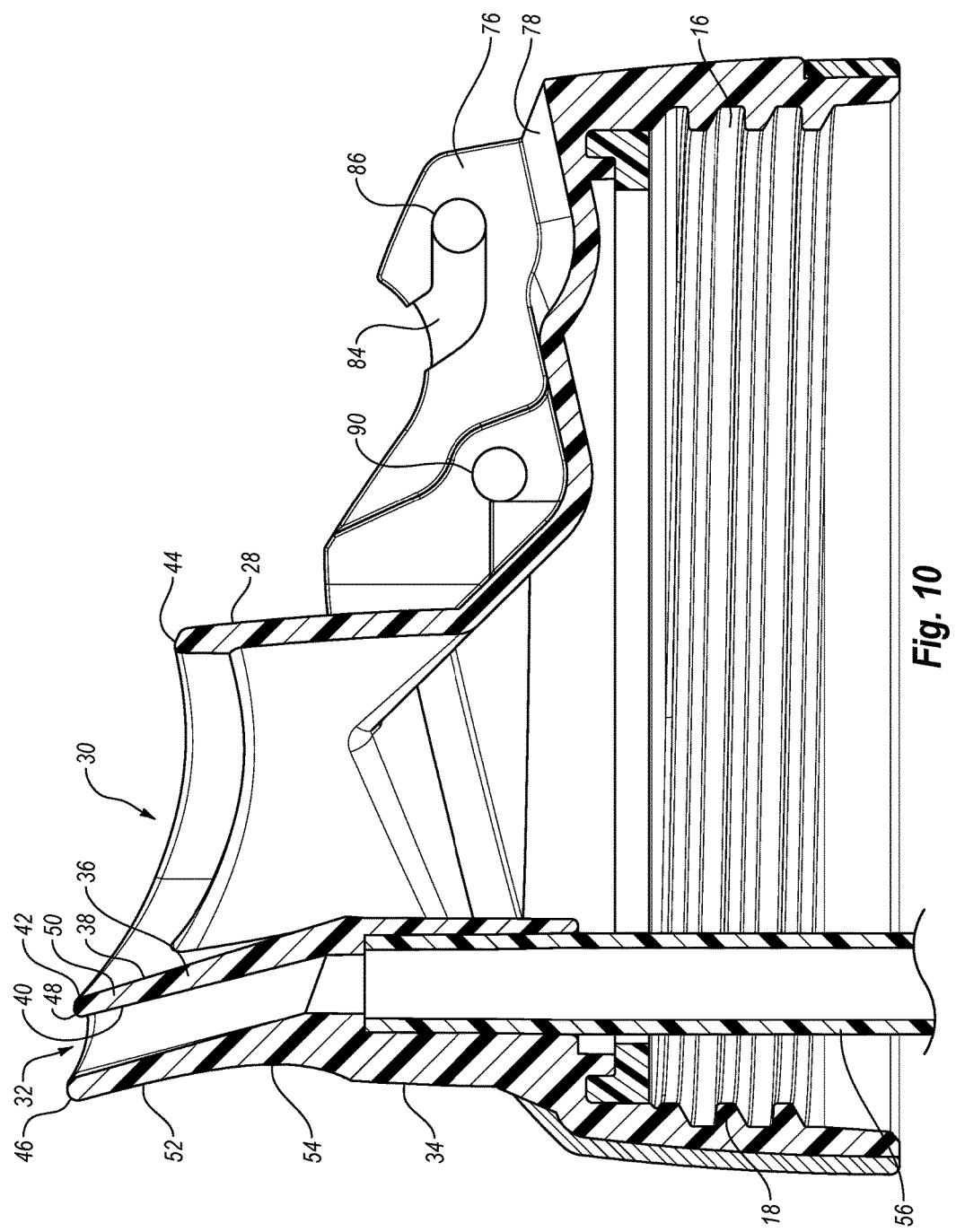
FIG. 10 is an enlarged cross-sectional side view of the portion of the lid shown in FIG. 3 along lines 9-9, illustrating a straw connected to the lid.
Figure 11:
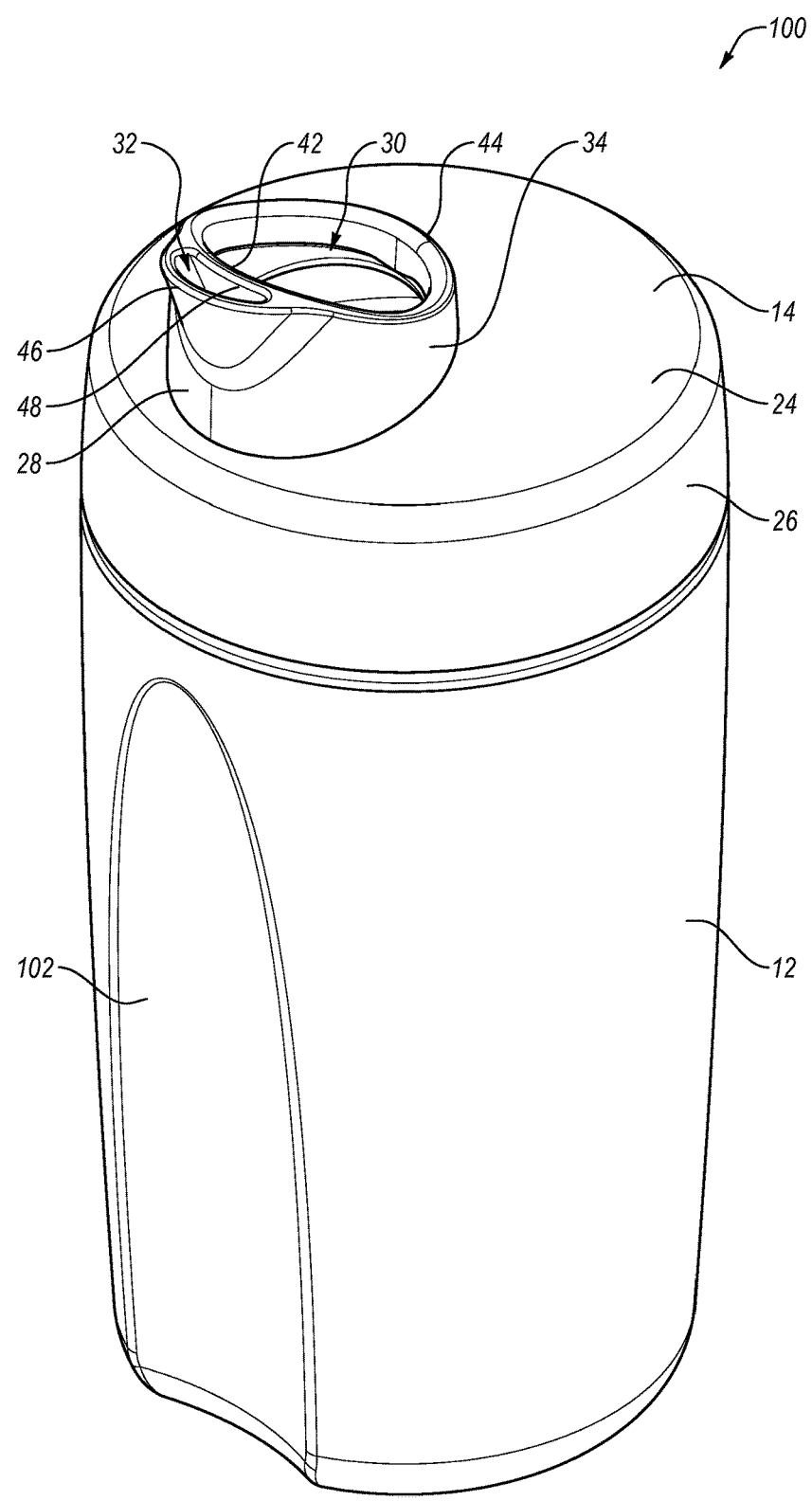
FIG. 11 is a front, upper perspective view of another exemplary container and lid.
Figure 12:
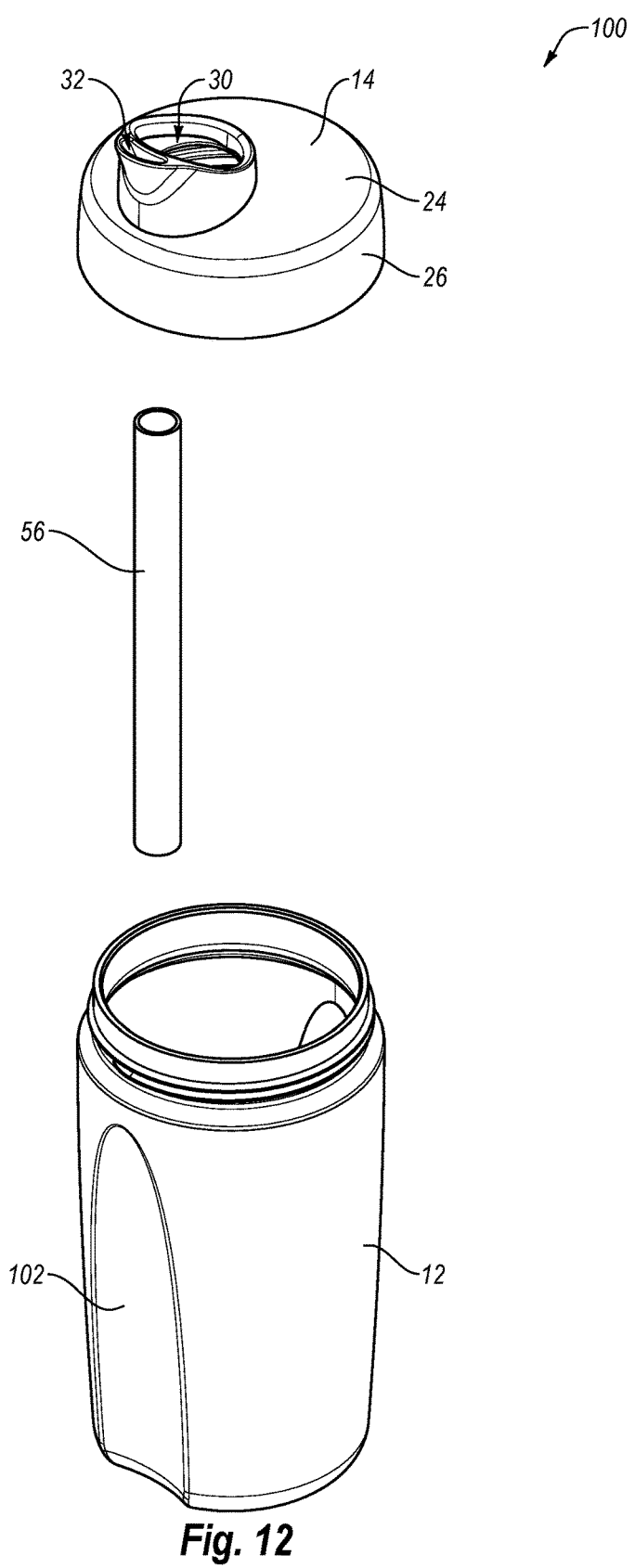
FIG. 12 is an exploded, front, upper perspective view and the container and lid shown in FIG. 11.
Figure 14:
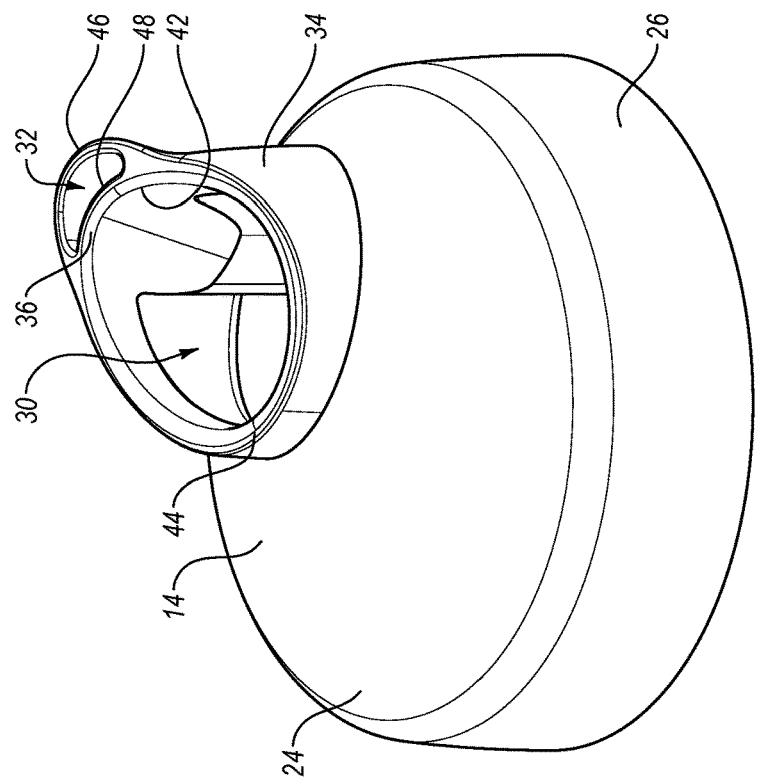
FIG. 14 is a rear, upper perspective view of the lid shown in FIG. 11.
Figure 13:
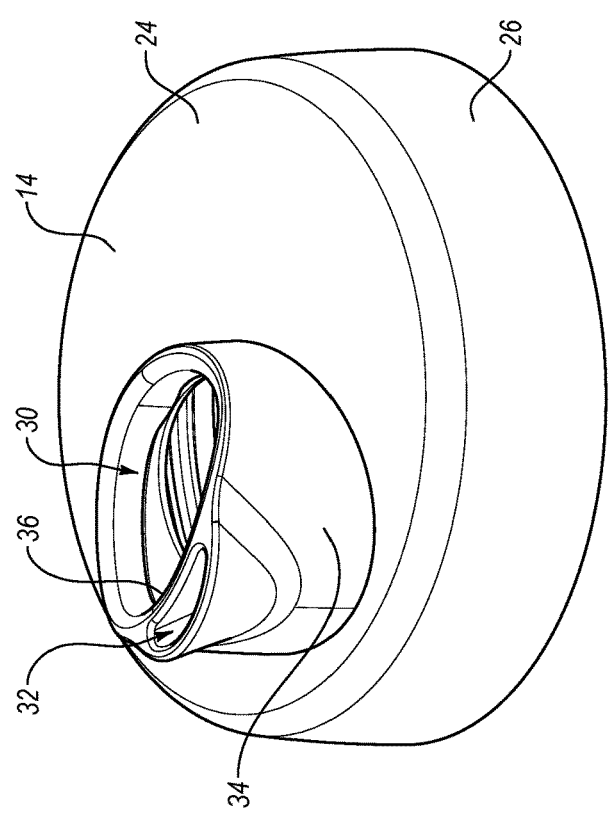
FIG. 13 is a front, upper perspective view of the lid shown in FIG. 11.
Figure 16:
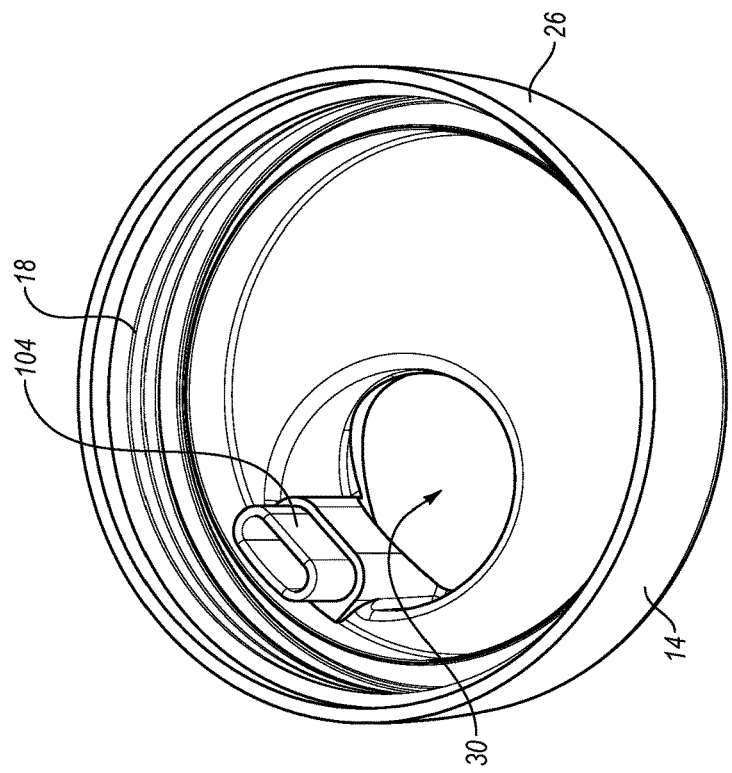
FIG. 16 is a lower perspective view of the lid shown in FIG. 11.
Figure 15:
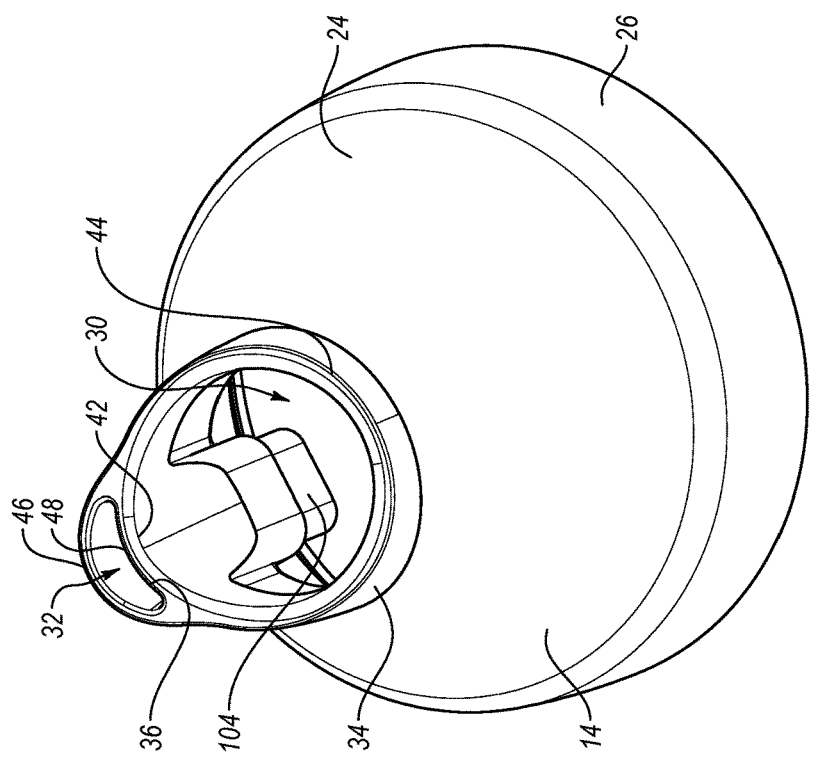
FIG. 15 is another rear, upper perspective view of the lid shown in FIG. 11.
Figure 17:
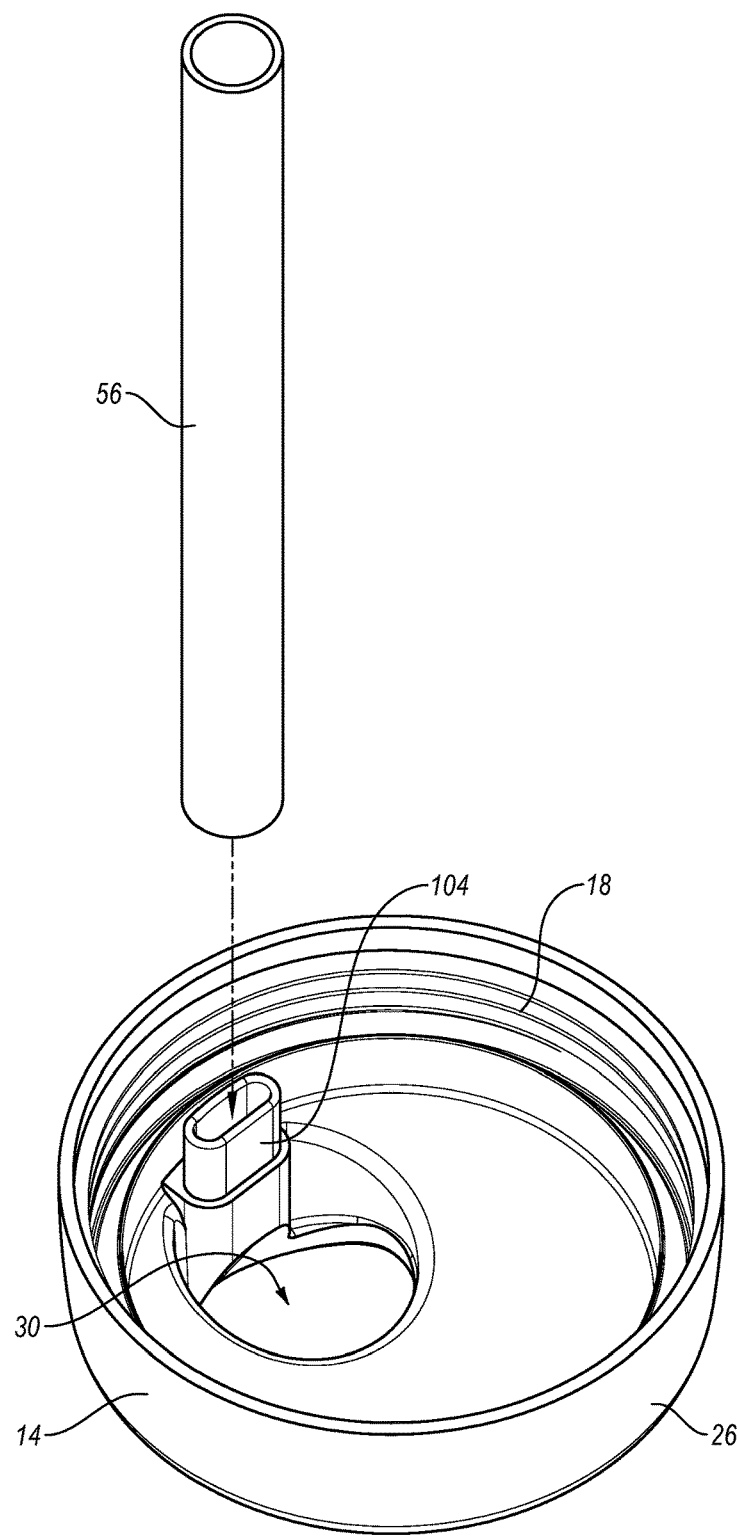
FIG. 17 is an exploded, lower perspective view of the lid shown in FIG. 11, illustrating an exemplary straw.

As best seen in FIGS. 9 and 10, the front portion of the spout 28 may extend upwardly and outwardly. For example, the upper portion of the openings 30, 32 may be curved. In particular, the front portion 42 of the first opening 30 may be curved upwardly relative to the rear portion 44 of the first opening. Thus, the front portion 42 of the first opening 30 may be disposed generally higher and/or in a different plane than the rear portion of the first opening. In addition, the front portion 46 of the second opening 32 may be curved upwardly relative to the rear portion 48 of the second opening. Therefore, the upper end of the first opening 32 may be generally disposed above and spaced further apart from the body 22 of the lid 14 than the upper end of the second opening 30. In addition, a center portion of the first opening 30 may be spaced closer to the body 22 of the lid 14 than a center portion of the second opening 32. Further, an upper portion 50 of the common wall 36 separating the first opening 30 and the second opening 32 may be angled forwardly. A front portion 52 of the spout 28 and/or the second opening 32 may also be angled forwardly. As shown in FIGS. 9 and 10, the upper portion 50 of the common wall 36 and the front portion 52 of the spout 28 and/or the second opening 32 may be disposed at an angle between about 5° and about 20°, and between about 10° and about 15°. For example, the common wall 36 and a front portion of the second opening 32 may be disposed at an angle between about 10° and about 20° relative to an axis disposed generally perpendicular to the first opening 30. If desired, an indentation or recessed portion 54 may be formed in the front portion 52 of the spout 28 and/or the second opening 32. The recessed portion 54 may form a lower lip receiving portion that is sized and configured to receive a lower lip of a person consuming a fluid flowing through the second opening of the lid.

The curved and angled surfaces of the spout 28, the first opening 30, and the second opening 32 may facilitate fluid flow through the openings. For example, the upwardly curved surfaces may facilitate sipping or sucking fluid through the second opening 32. In addition, the forwardly curved front portion 52 may facilitate sipping or sucking fluid through the second opening 32. In this exemplary embodiment, the upper end of the second opening 32 may be disposed generally higher and in a different plane than the upper end of the first opening 30. The curved and/or upper surfaces may create an upper lip receiving portion that is sized and configured to receive an upper lip of a user consuming fluid flowing through the second opening of the lid. Advantageously, this configuration may allow a user to easily and conveniently position their mouth and lips to sip or suck fluid through the second opening 32. This configuration may also allow a user to easily and conveniently position their mouth and lips to allow fluid to be poured out of the first opening 30 and directly into the mouth of the user so that a large volume of fluid may be quickly consumed.

While the first and second openings 30, 32 are shown and described as being part of the spout 28, it will be appreciated after reviewing this disclosure that the openings do not have to be part of the spout and a spout is not required. It will also be appreciated after reviewing this disclosure that the lid 14 may include any suitable number of openings (such as one, two, three, or more) and the openings could have different shapes, sizes, configurations and arrangements depending, for example, upon the intended use of the lid system 10.

As shown in FIGS. 2, 7, 8 and 10, a conduit 56, such as a straw, may be used in connection with one or more of the openings. For example, the straw 56 may be used in connection with the second opening 32 and the straw may aid in drinking from the container 12. Thus, a user may sip or drink by sucking on the second opening 32 and fluid may travel through the straw 56 and the second opening to the user.

The straw 56 may be selectively or permanently connected to the second opening 32. For example, the lid 14 may include a straw coupling portion 58, such as a straw receiving recess, and an end of the straw 56 may be inserted into the recess. The straw 56 may have a length that extends towards a bottom of the container 12 and a lower end of the straw may be in fluid communication with fluid disposed towards the bottom of the container. While the straw 56 and straw receiving recess 58 may have oblong or elongated configuration as shown in the drawings, it will be appreciated that the straw and straw receiving recess could have other suitable shapes, sizes, configurations and arrangements, such as circular, oval, rectangular, square, polygonal, and the like.

The first and second openings 30, 32 may provide different fluid pathways. For example, the first opening 30 may provide a first pathway with direct access to the container 12 and fluid may flow through the first opening when the container is tilted or inverted. The large size of the first opening 30 may allow a large quantity of fluid to flow through the first opening, which may allow the contents of the container 12 to be quickly consumed or poured. The first opening 30 may also allow the container 12 to be quickly refilled, replenished or topped off. The second opening 32 and the conduit or straw 56 may provide a second pathway in which fluid may be sipped or sucked from the container 12. In this exemplary embodiment, fluid may be sipped or sucked through the second opening 32 and the straw 56 when the container 12 is in a generally upright position. It will be understood that fluid may flow through the first opening 30 once the container 12 is tilted such that fluid in the container reaches the front portion 42 of the first opening because the first opening may provide a fluid pathway to an upper portion of the container. It will also be understood that fluid may flow through the second opening 32 as long as the end of the straw 56 is disposed within the fluid in the container 12 because the straw or conduit may provide a fluid pathway to a lower portion of the container. Thus, the positioning of the container 12 may determine whether fluid is capable of flowing through the first and/or second openings 30, 32.

Advantageously, the multiple openings 30, 32 may provide increased functionality and flexibility by allowing fluid to be poured, sipped or sucked from the container 12. In addition, the multiple openings 30, 32 may allow fluid to be discharged or dispensed when the container 12 is disposed in upright, tilted, and inverted positions. After reviewing this disclosure, it will be appreciated that the straw 56 may be connected to or used in connection with any suitable opening, and the straw is not required. It will be further appreciated that the openings 30, 32 may be in different locations, arrangements and placements, and the openings may be spaced apart if desired.

The lid 14 may include a closure 60 that selectively closes or prevents fluid flow through the spout 28 and/or the one or more openings, such as the openings 30 and 32. The closure 60 may be pivotally connected to the lid 14 and the closure may create a consistent, reliable seal. In addition, when the closure 60 is in the closed position, a force or other intentional act may be required to open the closure and that may help prevent unintended opening of the closure. Further, when the closure 60 is moved into the closed position, it may snap, click and/or lock, which may indicate that the closure is securely closed.

As shown in FIG. 2, the closure 60 may include a first portion 62, such as an activator, and a second portion 64, such as a cover. The cover 64 may create an airtight and/or watertight seal with the spout 28, the first opening 30 and/or the second opening 32, which may advantageously help create a leak-proof container.

The activator 62 may facilitate opening and/or closing the closure 60. The activator 62 may also facilitate carrying, holding, and/or transporting the lid system 10. The activator 62 may include a body 66 and one or more engaging portions, such as outwardly extending portions, protrusions, projections, and the like (exemplary protrusions 122, 124 are discussed in more detail below) and the engaging portions may allow the activator 62 to be pivotally, movably, or rotatably connected to the lid 14. For example, as best seen in FIGS. 3-6, the upper portion 24 of the lid 14 may include a recess 72 at least partially formed or defined by a first sidewall 74, a second sidewall 76 and a lower surface 78. As shown in the accompanying figures, the sidewalls 74, 76 may be disposed generally perpendicular to the lower surface 78 and may be generally vertically disposed. The first sidewall 72 may include a first groove or channel 80 with a first receiving portion 82 and the second sidewall 76 may include a second groove or channel 84 with a second receiving portion 86. The first and second receiving portions 82, 86, which may be openings, apertures, depressions, indentations, detents and the like, may be sized and configured to receive the engaging portions, such as the protrusions 122, 124, of the activator 62 and this may allow the activator to be pivotally connected to the lid 12.

The cover 64 may also be pivotally, movably, or rotatably connected to the lid 14. For example, the cover 64 may be pivotally connected to a receiving portion 88 in the first sidewall 74 of the recess 72 and a receiving portion 90 in the second sidewall 76 of the recess. In particular, the receiving portions 88, 90 may be sized and configured to receive corresponding engaging portions 92, 94, such as projections, pins or protrusions. The distance between the receiving portions 88, 90 may be smaller than the distance between the receiving portions 82, 86. For example, a portion of the sidewalls 74, 76 may extend inwardly and that may decrease the distance between the receiving portions 88, 90 in comparison to the distance between the receiving portions 82, 86. In addition, one or more guides 96 may be used to facilitate alignment and positioning of the closure 60. For instance, one or more guides 96 may be disposed in the lower surface 78 of the recess 72. The guides 96 may help align and/or position the cover 64 of the closure 60. It will be appreciated after reviewing this disclosure that the guides 96 may be disposed in other appropriate locations and the guides are not required.

The activator 62 may include a handle 98 and the handle may have a loop-shaped configuration, such as shown in FIGS. 1 and 2, which may aid in carrying the lid system 10 and/or attaching the system to other objects. For example, the handle 98 may be attached to a clip or other suitable type of fastener. Advantageously, the clip may be attached to a backpack or another type of device for ease of transportation. In addition, the handle 98 may be positioned such that when the lid system 10 is held by the handle, a closing force may be applied to the closure 60. Significantly, this closing force may help maintain the closure 60 in a closed position and may help maintain a fluid-tight seal. Further, if the lid system 10 is held by the handle 98 and the closure 60 is in the open position, a closing force that tends to close the closure may be applied.

After reviewing this disclosure, it will be understood that the closure 60 may have other suitable shapes, sizes, configurations and arrangements. For example, another exemplary embodiment of the closure 60 is shown in FIGS. 19-27, which is described in greater detail below. It will be understood that the closure 60 may have any suitable number of parts, components, features and aspects, such as those shown in FIGS. 1-2 and/or 19-29.

FIGS. 11-18 illustrate another exemplary embodiment of a lid system 100. The lid system 100 may have one or more aspects, features, parts, and/or components as the lid system 10 previously described or in the lid system 110 described below. In addition, the lid system 100 may have similar shapes, sizes, configurations and arrangements as the lid systems 10 or 110. The lid system 100, however, may include additional or fewer parts, components, features and aspects than shown in connection with the lid systems 10 or 110. For example, the lid system 100 may not include a closure.

The lid system 100 illustrates that the container 12 and the lid 14 may have different shapes, sizes, configurations and arrangements. For example, the container 12 may have a more cylindrical configuration and one or more gripping surfaces 102. The gripping surfaces 102 may be recessed, generally planar, textured, and the like to facilitate gripping of the container 12.

Figure 18:
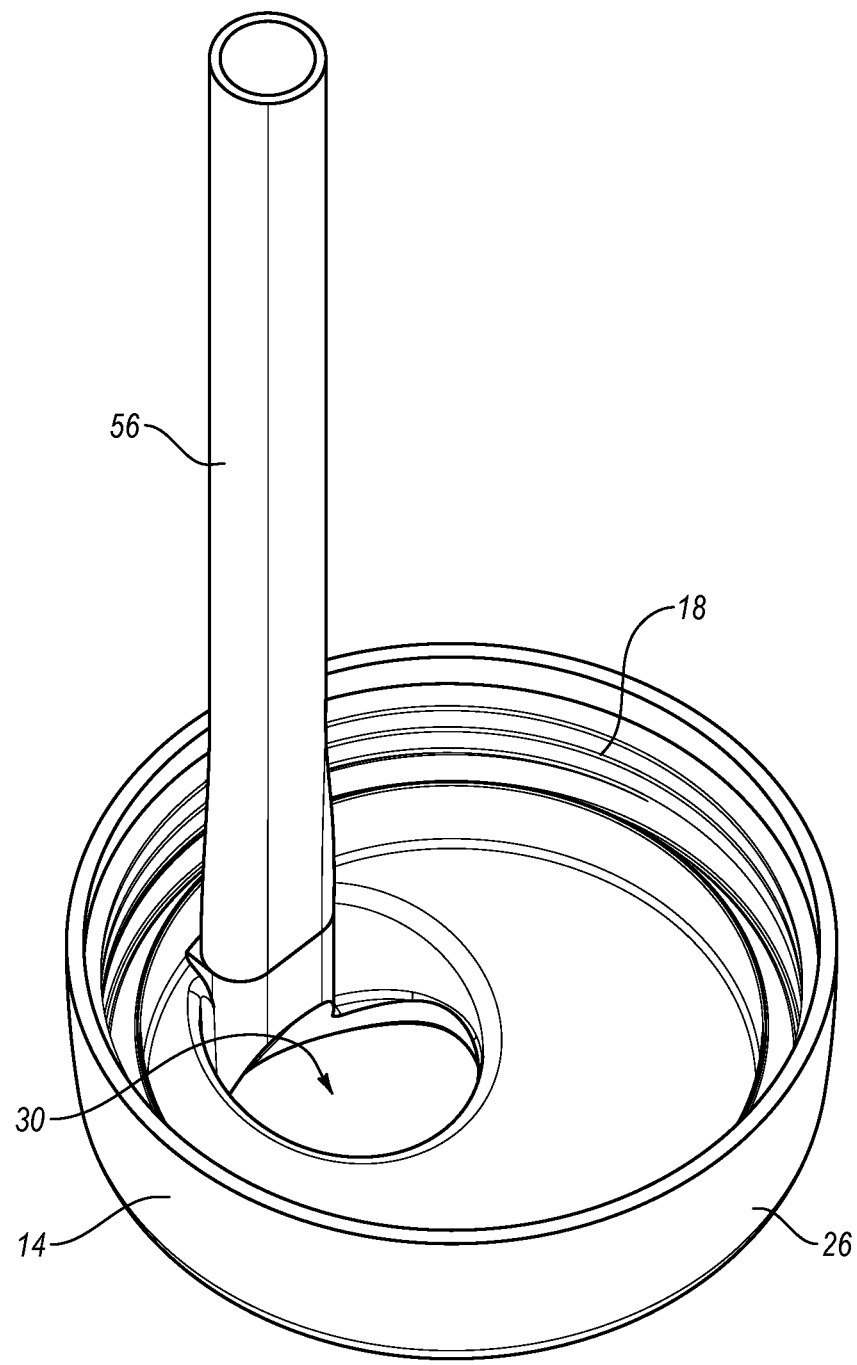
FIG. 18 is a lower perspective view of the lid and straw shown in FIG. 17, illustrating the straw attached to the lid.

The lid 14 may also include a generally planar upper surface 24 and the spout 28 may extend upwardly from the upper surface. In this exemplary configuration, the first opening 30 may have a generally circular configuration and the second opening 32 may jut or extend forwardly relative to the first opening. Additionally, the front portion 42 of the first opening 30 may be generally aligned and disposed in the same plane as the front portion 46 and the rear portion 48 of the second opening 32. The straw 56 may be connected to an opening, such as the second opening 32. As best seen in FIGS. 15-18, the straw 56 may be connected to an engaging portion 104. For example, the straw 56 may have a generally circular configuration and the end of the straw 56 may be deformed so that it has a shape corresponding to that of the engaging portion 104. As seen in FIG. 18, the engaging portion 104 may be disposed inside the end of the straw 56. It will be understood that the straw 56 and engaging portion 104 could also have other suitable shapes and sizes. For instance, the straw 56 and engaging portion 104 could have complementary shapes such as circular, oval, rectangular, square, polygonal or the like. The straw 56 could also be inserted into the engaging portion 104 and the straw may be permanently or selectively attached to the engaging portion. In addition, the straw 56 and engaging portion 104 could be coupled together using other structures such as fasteners, coupling members, etc. The connection of the straw 56 to the engaging portion 104 may create a seal, which may facilitate drinking through the straw.

Another exemplary embodiment of a lid system 110 is shown in FIGS. 19-27. The lid system 110 may have one or more aspects, features, parts, and/or components as the lid systems 10 or 100 described above. The lid system 110 may also have similar shapes, sizes, configurations and arrangements as the lid systems 10 or 100.

The lid system 110 may include a container 12 with one or more gripping surfaces 102. A user with arthritic hands may find it easier to place a thumb on a first gripping surface 102 and fingers on a second gripping surface to grasp the container 12.

The lid system 110 may also include a lid 14 with an upper portion 24, a sidewall 26 and a spout 28. The spout 28 may include a single opening 112 instead of the dual openings shown in other exemplary embodiments. It will be understood that the lid 12 may include any suitable number of openings and the openings may or may not be used in connection with the spout 28. A closure 60 may provide controlled access to the contents of the container 12. The closure 60 preferably creates a watertight or airtight seal with the spout 28 and/or the opening 112 to prevent the contents from leaking or spilling.

Figure 19:
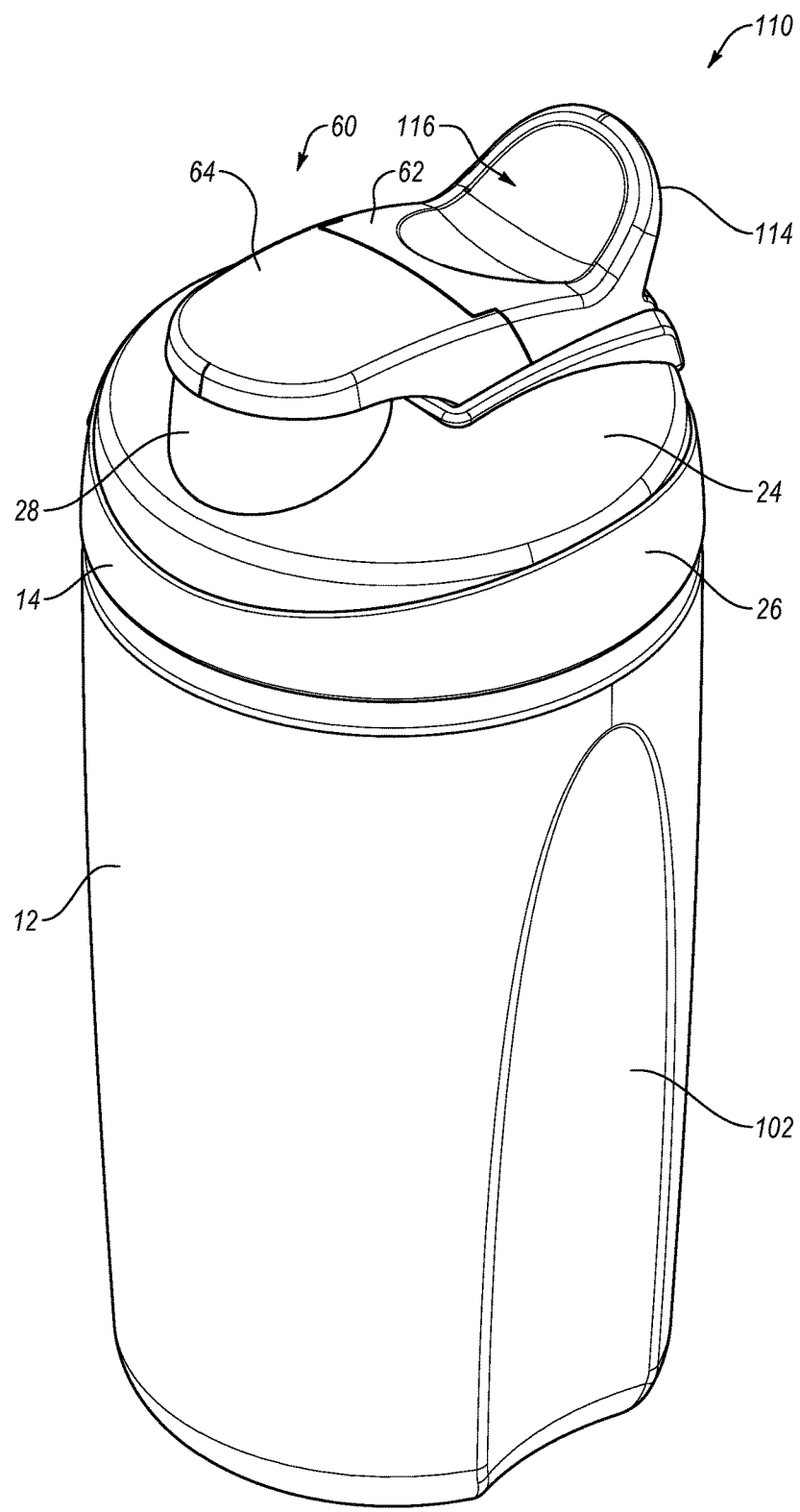
FIG. 19 is a front, upper perspective view of still another exemplary container and lid, illustrating the lid in a closed position.
Figure 20:
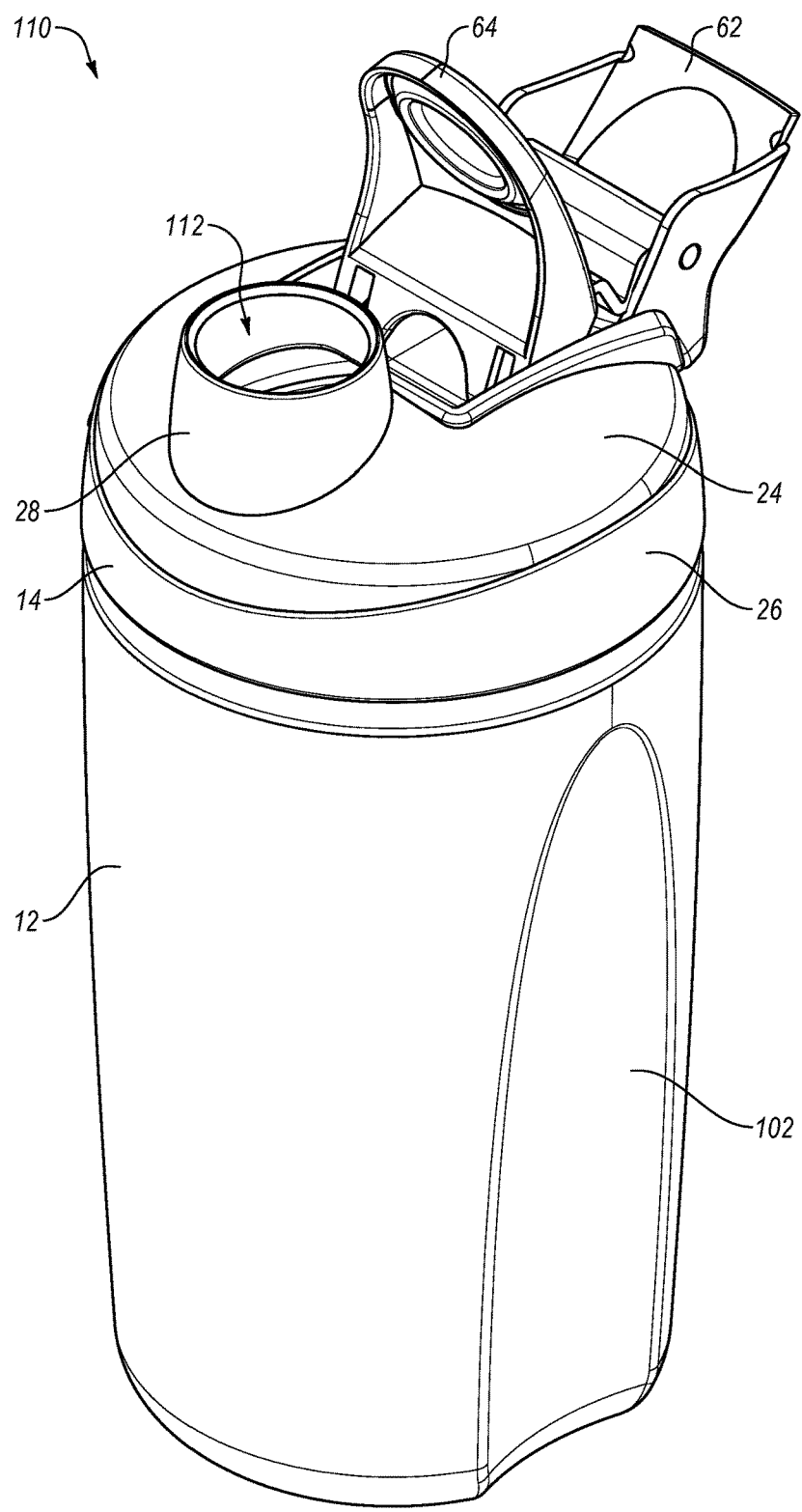
FIG. 20 is another front, upper perspective view of the container and lid shown in FIG. 19, illustrating the lid in an open position.
Figure 21:
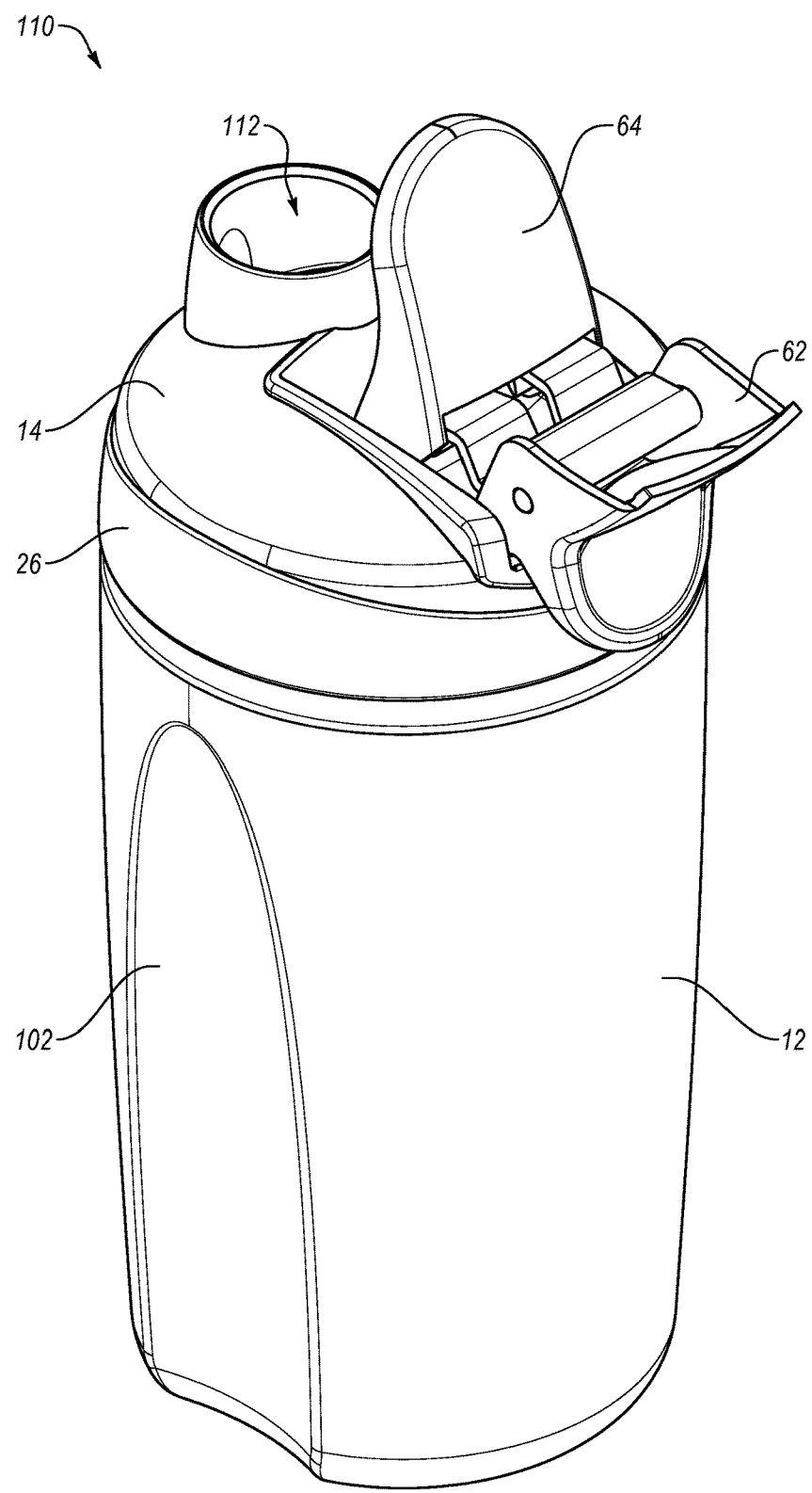
FIG. 21 is a rear, upper perspective view of the lid and container shown in FIG. 19, illustrating the lid in an open position.
Figure 22:
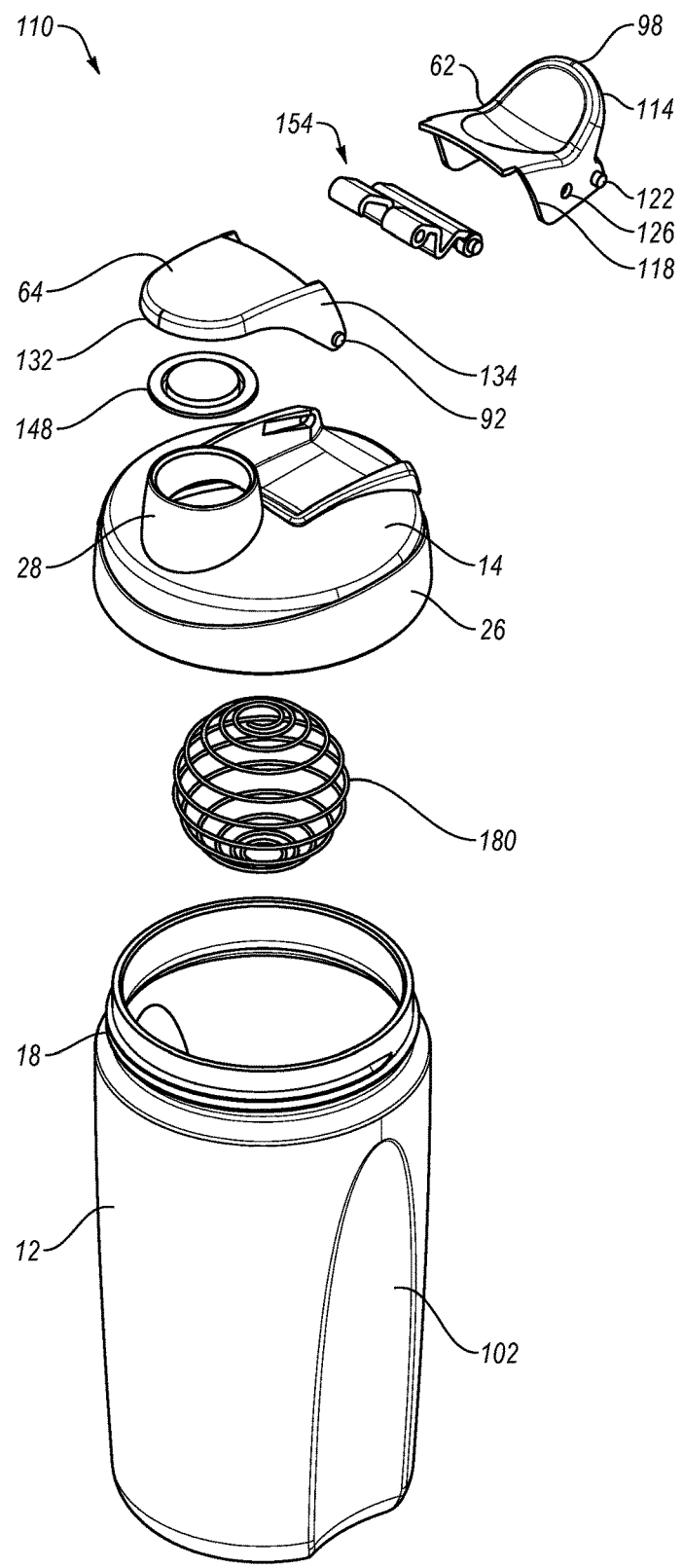
FIG. 22 is an exploded front, upper perspective view of the container and lid shown in FIG. 19.
Figure 23:
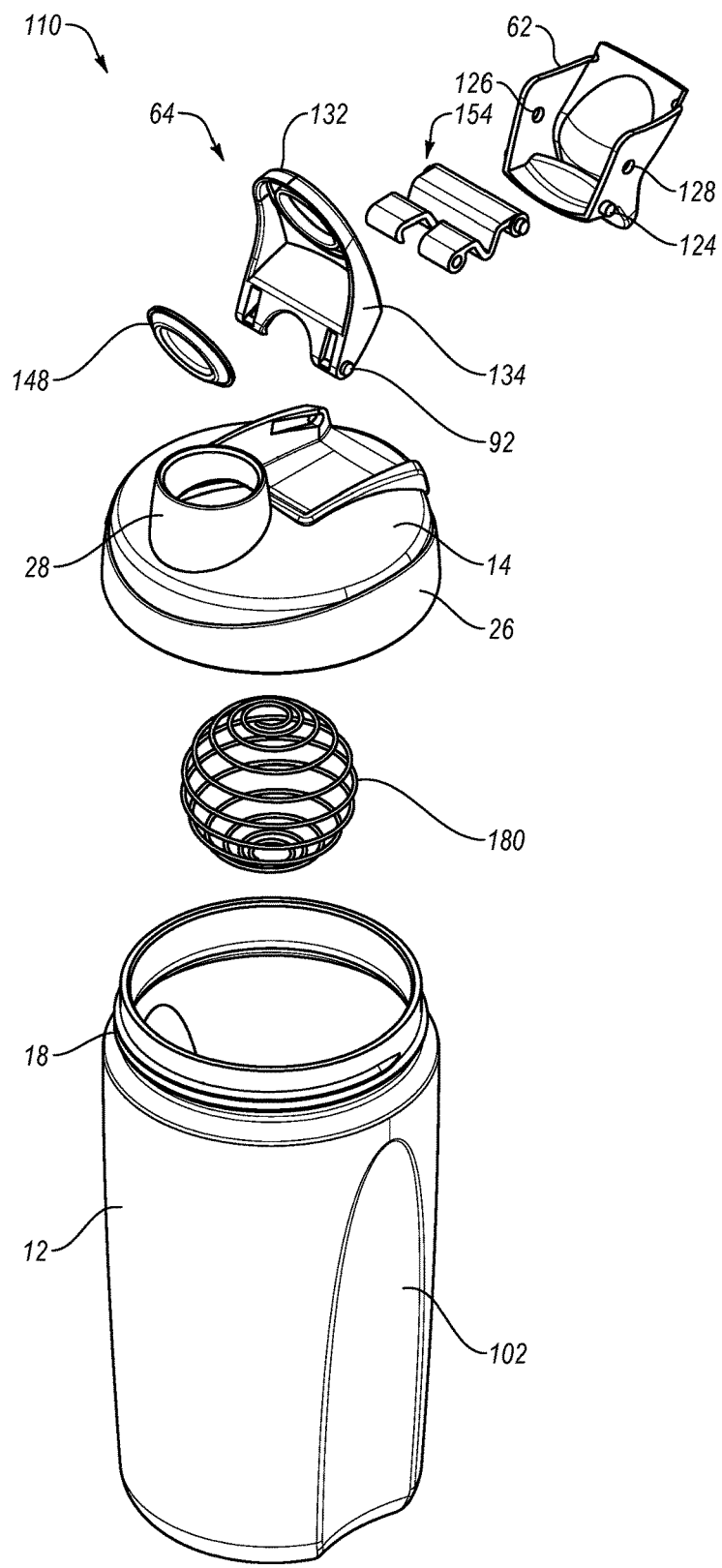
FIG. 23 is another exploded front, upper perspective view of the container and lid shown in FIG. 19.
Figure 24A:
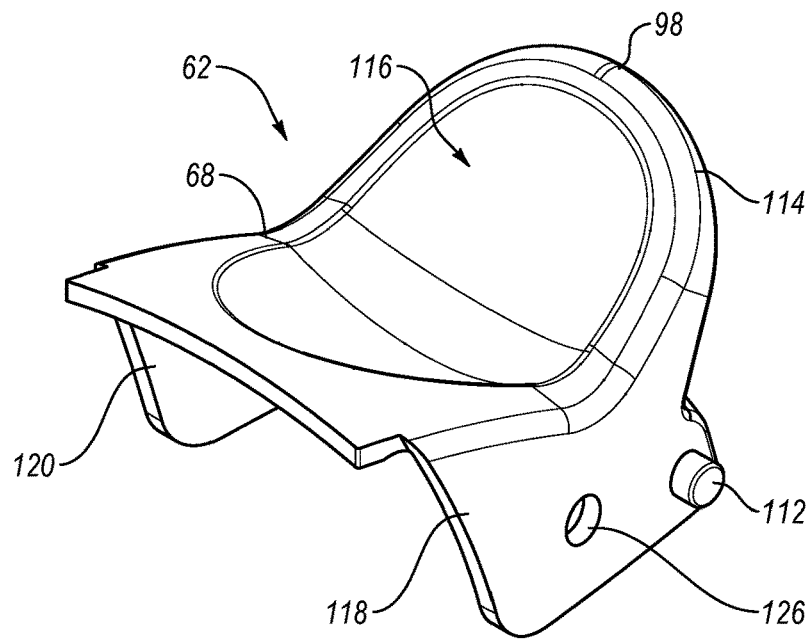
FIG. 24A is an enlarged, upper perspective view of a portion of the lid shown in FIG. 21, illustrating an exemplary activator.
Figure 24B:
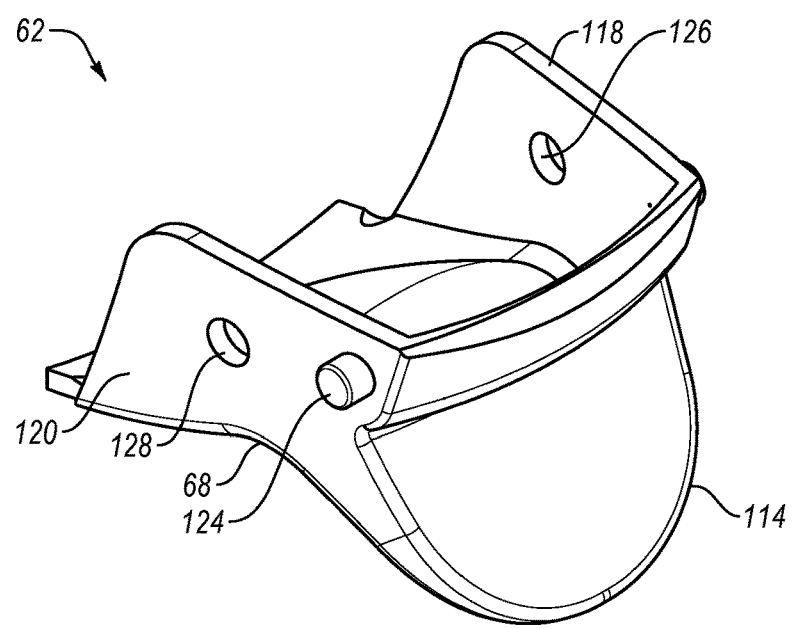
FIG. 24B is a lower perspective view of the activator shown in FIG. 24A.
Figure 25A:
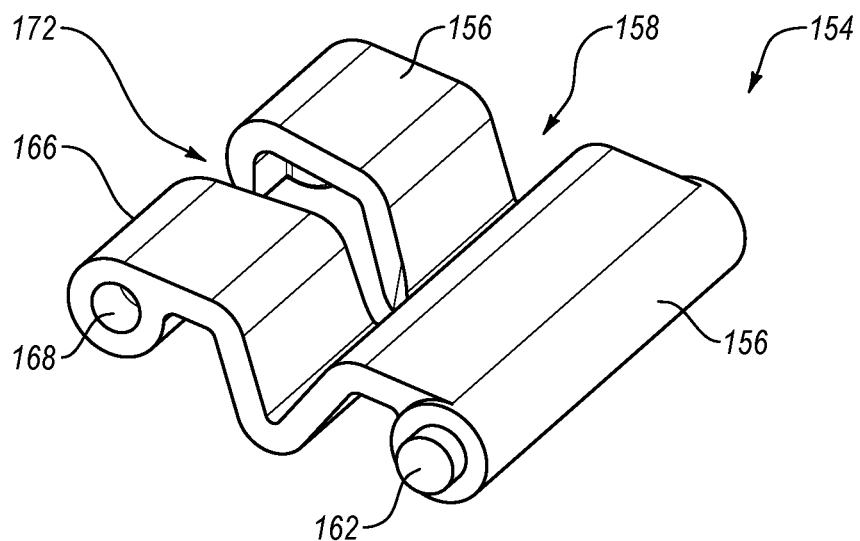
FIG. 25A is an enlarged, upper perspective view of a portion of the lid shown in FIG. 21, illustrating an exemplary connecting member.
Figure 25B:
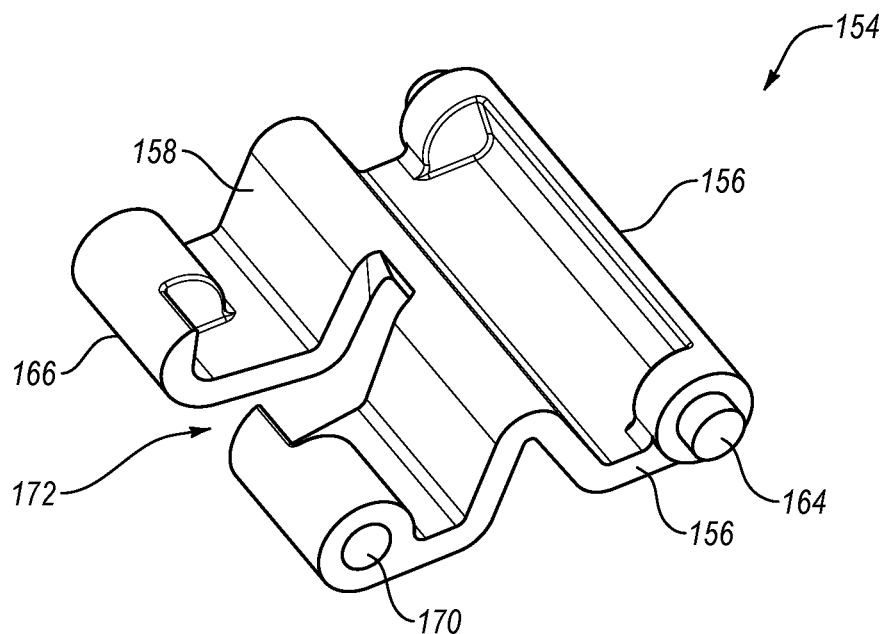
FIG. 25B is a lower perspective view of the connecting member shown in FIG. 25A.

In greater detail, as best seen in FIGS. 24A and 24B, the closure 60 may include an activator 62 with a body 68 and a lever 114. The lever 114 may extend outwardly from the body 68 and may facilitate movement of the activator 62. The lever 114 may also form at least a portion of a handle, such as a handle 98. The lever 114 may include one or more curved surfaces, such as a depression or recess 116, which may be sized and configured to allow a user to apply a force to the activator 62. For example, as shown in FIG. 19, the lever 114 may include a recess 116 and the recess may facilitate applying a force to the activator 62. In particular, a force applied to the lever 114 and/or the recess 116 may tend to open the closure 60.

The activator 62 may be pivotally connected to the lid 14. For example, as shown in FIGS. 24A and 24B, the activator 62 may include a pair of flanges 118, 120 and each flange may include an engaging portion 122, 124, such as a protrusion or projection, and the engaging portions may allow the activator to be pivotally, rotatably, or movably attached to the lid 14. In particular, the activator 62 may be pivotally attached to the lid 14 by coupling the engaging portions 122, 124 with the first and second receiving portions 82, 86 in the first and second sidewalls 74, 76, respectively. The engaging portions 122, 124 and the receiving portions 82, 86 may create a pivot point and the activator 62 may pivot about an axis of rotation that is generally aligned with the pivot point. The activator 62 may also include one or more receiving portions 126, 128, such as first and second openings or apertures, and the receiving portions may be formed in the flanges 118, 120.

Figure 26A:
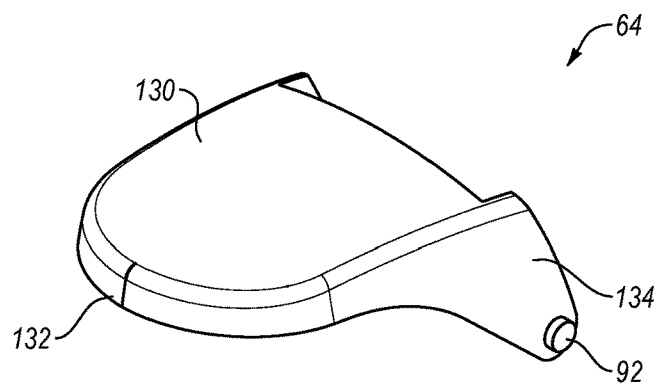
FIG. 26A is an enlarged, upper front perspective view of a portion of the lid shown in FIG. 21, illustrating an exemplary cover.
Figure 26B:
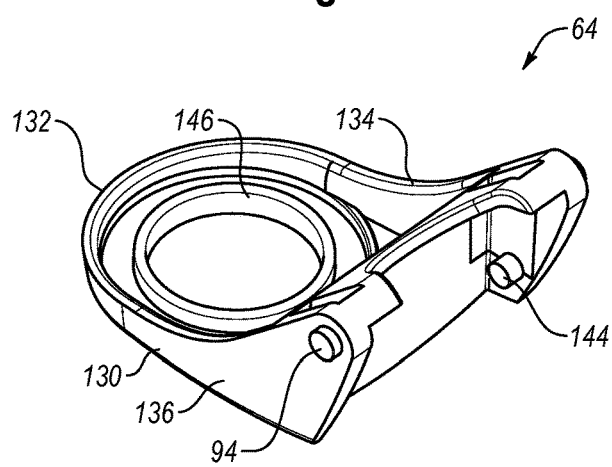
FIG. 26B is a lower rear perspective view of the cover shown in FIG. 26A.
Figure 26C:
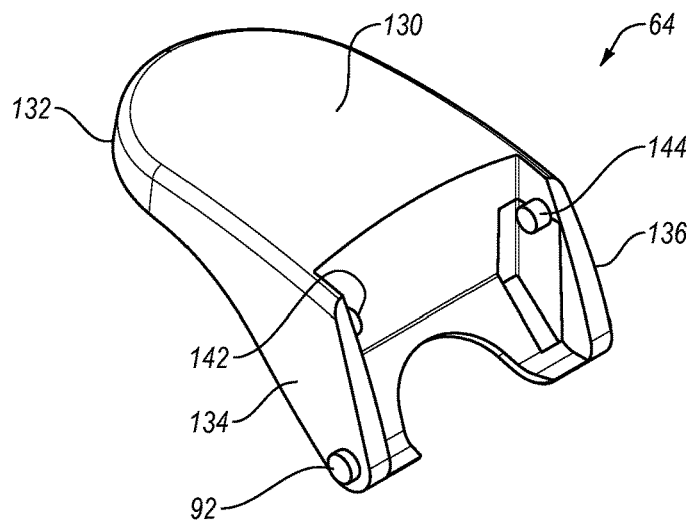
FIG. 26C is an upper rear perspective view of the cover shown in FIG. 26A.

The closure 60 may also include a cover 64 and, as discussed above, the cover may be pivotally attached to the lid 14 by coupling the engaging portions and the receiving portions 88, 90 in the sidewalls 74, 76 of the recess 72. In greater detail, as best seen in FIGS. 26A-26C, the cover 64 may include a body 130 and a lip 132. The lip 132 may be disposed about a portion of the perimeter of the body 130 and the lip may be sized and configured to be disposed around the spout 28 and/or the opening 112. The cover 64 may also include flanges 134, 136, which may extend outwardly from the body 130 and the flanges may be part of and/or aligned with the lip 132. The engaging portion 92 may extend outwardly from the flange 134 and the engaging portion 94 may extend outwardly from the flange 136. The engaging portions 92, 94 may be coupled to the receiving portions 88, 90 to pivotally attach the cover 64 to the lid 14. The receiving portions 88, 90 and the engaging portions 92, 94 may create a pivot point and the cover 64 may pivot about an axis of rotation that is generally aligned with the pivot point. The cover 64 may also include one or more engaging portions, such as inwardly extending projections or projections 142, 144.

Figure 27A:
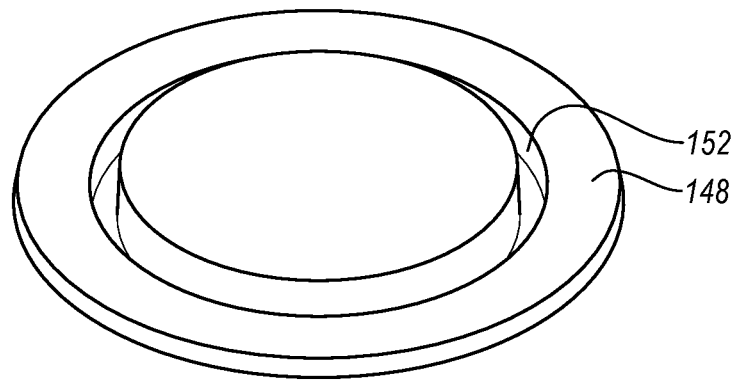
FIG. 27A is an enlarged, upper perspective view of a portion of the lid shown in FIG. 21, illustrating an exemplary gasket.
Figure 27B:
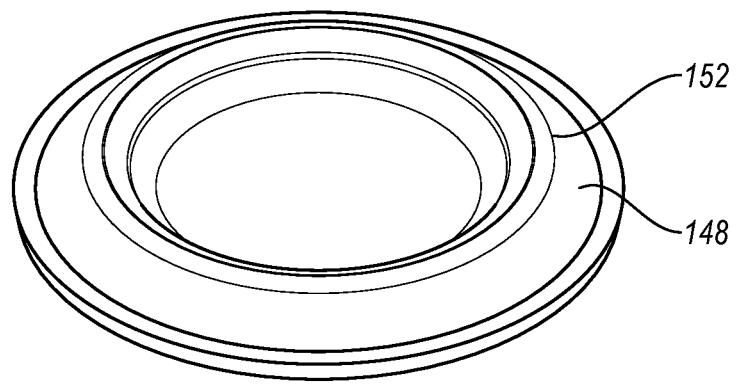
FIG. 27B is a lower perspective view of the gasket shown in FIG. 27A.

The cover 64 may include additional features, which may help create a seal with the spout 28 and/or opening 112. For example, the cover 64 may include a downwardly extending lip 146 or flange and the lip may be sized and configured to be disposed at least partially within the spout 28 and/or the opening 112 when the cover is closed. A gasket 148 may be used with the lip 146 to help create a fluid-tight seal. An exemplary gasket 148 is shown in FIGS. 27A and 27B and the gasket may include a receiving portion 150 that is sized and configured to receive at least a portion of the lip 146 and an engaging portion 152 that may be sized and configured to engage the spout 28 and/or the opening 112 when the cover 64 is in the closed position.

In this exemplary embodiment, the activator 62 and the cover 64 may both be pivotally connected to the lid 14 in fixed positions. In addition, the activator 62 may rotate about a first axis of rotation and the cover 64 may rotate about a second axis of rotation. The distance between the first and second axes of rotations may be fixed or a constant distance.

A connecting member 154 may connect the activator 62 and the cover 64 and the connecting member may be changeable or variable in length. For instance, the connecting member 154 may include a body 156 and a biasing portion 158. The biasing portion 158 may be flexible, bendable, compressible, and/or expandable portion. The biasing portion 158 may allow the distance between the ends of the connecting member 154 to change. The biasing portion 158 may also bias the connecting member 154 into one or more desired configurations. The biasing portion 158 may also be a spring or have spring-like qualities or aspects. As shown in the accompanying figures, the connecting member 154 may be constructed from an elastic, bendable, malleable, flexible and/or resilient material, such as plastic, and the biasing portion 158 may have a generally V-shaped configuration. When a force is applied in one direction to the connecting member 154, such as along a length of the connecting member, the biasing portion 158 may allow the overall length of the connecting member to be increased. When the force is removed or a force in an opposing direction is applied, the biasing portion 158 may allow the overall length of the connecting portion 154 to be decreased. The biasing portion 158 may resiliently deform to allow the length of the connecting member 154 to increase or decrease, and the biasing portion may be sized and configured to bias the connecting member into a particular length or configuration.

The connecting member 154 may include a first end 160 that may be connected to the activator 62. For example, the first end 160 can include engaging portions 162, 164, such as protrusions, that are sized and configured to be disposed in the receiving portions 126, 128 of the activator 62. The receiving portions 126, 128 and the engaging portions 162, 164 may allow the connecting member 154 to be pivotally connected to the activator 62. This pivotal connection may provide a pivot point and the connecting member 154 may rotate about an axis of rotation relative to the activator 62. The connecting member 154 may also include a second end 166 that is connected to the cover 64. The second end 166 may include receiving portions 168, 170, such as openings or apertures, which are sized and configured to receive the engaging portions 142, 144 of the cover 64, which may allow the connecting member 154 to be pivotally connected to the cover. This pivotal connection may provide a pivot point and the connecting member 154 may rotate about an axis of rotation relative to the cover 64. The connecting member 154 can also include a cutout or notch 172 if desired. The notch 172 may facilitate assembly by allowing the second end 166 of the connecting member 154 to be squeezed together so that the engaging portions 142, 144 can be inserted into the receiving portions 168, 170.

Because the length of the connecting member 154 may change, that may account for different distances between the connection of the connecting member to the activator 62 and the cover 64. In addition, the connecting member 154 may have sufficient stiffness and rigidity that when an opening force is applied to the activator 62 and the activator is moved from a closed position to an open position, the connecting member may cause the cover 64 to rotate and expose the end of the spout 28 and/or one or more openings (such as openings 30, 32 or 112). The connecting member 154 may also cause the cover 64 to close when the activator 62 is being closed.

In greater detail, when the activator 62 is moved, the connecting member 154 and the cover 64 may also move. For example, a force may cause the activator 64 to rotate about the pivotal connection of the activator and the lid 14, and the movement of the activator may apply a force to the connecting member 154. In particular, a force moving the activator 62 from a closed position to an open position may cause the connecting member 154 to move away from the spout 28 and/or the openings 30, 32, 112, and the connecting member may apply a force to the cover 64 that causes the cover to rotate from a closed position to an open position. On the other hand, a force moving the activator 62 from an open to a closed position may cause the connecting member 154 to move towards the spout 28 and/or the openings 30, 32, 112, and the connecting member may apply a force to the cover 64 that causes the cover to rotate from an open position to a closed position.

The closure 60 may include four pivot points. For example, a first pivot point may be located where the activator 62 is connected to the lid 14, a second pivot point may be located where the cover 64 is connected to the lid, a third pivot point may be located where the connecting member 154 is connected to the activator, and a fourth pivot point may be located when the cover is connected to the activator. The closure 60 may also rotate about four different axes of rotation when the closure is being moved. For example, the activator 62 may rotate about a first axis of rotation relative to the lid 14, the cover 64 may rotate about a second axis of rotation relative to the lid, the connecting member 154 may rotate about a third axis of rotation relative to the activator, and the connecting member may rotate about a fourth axis of rotation relative to the cover. Therefore, the closure 60 may include four pivot points and/or four axes of rotation.

The first and second pivot points or axes of rotation may be disposed in fixed locations and the third and fourth pivot points or axes of rotation may move relative to the lid 14 when the closure 60 is being moved. The third and fourth pivot points or axes of rotation may move along a path, such as an arc or curve, when the closure 60 is moved between the opened and closed positions. Therefore, the first and second pivot points or axes of rotation may be disposed in fixed locations relative to the lid 14 and separated by a fixed distance, and the third and fourth pivot points or axes of rotation may not be disposed in fixed positions relative to the lid or separated by a generally constant distance. For example, the distance between the third and fourth pivot points or axes of rotations may increase or decrease as the closure 60 is opened or closed.

The closure 60 may be an over center latching mechanism. In particular, the activator 62, the cover 64 and the connecting member 154 may form an over center latching mechanism that maintains the cover 64 in the closed position and requires a significant amount of force to open the cover. For example, the connecting member 154 may provide a force that maintains the cover 64 in the closed position and a force applied to the activator 62 may be used to overcome the closing force. Advantageously, because the activator 62 may act as a lever, the activator may be used to overcome a much larger closing force. A maximum amount of force may be required when the distance between the connection of the connecting member 154 to the activator 64 and the connection of the connecting member to the cover 64 is at a minimum, which may be referred to as the center point of the latching mechanism. Once the activator 62 is moved or rotated past the center point, the closure 60 may be more easily opened. When the activator 62 is moved from the open position to a closed position, sufficient force must be applied to allow the activator to move or rotate past the center point. Significantly, the over center latching mechanism may cause the cover 64 to snap or lock in position, and that may securely maintain the cover in the closed position.

In some embodiments, a mixing device 180, such as a BLENDER BALL® (which is a registered trademark of BlenderBottle Co.), may be used to mix contents of the container 12. For example, the mixing device 180 may be used to mix one or more liquids. The mixing device 180 may also be used to mix liquids and solids such as supplements, vitamins, protein powders, and/or other types of materials. Further, the lid systems 10, 100 and/or 110 may be a shaker cup and the contents can be stirred or mixed as desired. This may allow protein drinks, shakes, smoothies, sauces, etc. to be created within the container 12.

One of ordinary skill in the art will appreciate after reviewing this disclosure that the systems 10, 100, 110, container 12, the lid 14, and the various parts and components may have other suitable shapes, sizes, configurations and arrangements, such as shown in U.S. Pat. No. 8,695,830, which is incorporated by reference herein in its entirety.

In operation, a force may be applied to the activator 62 to open the closure 60. This may allow fluids to be poured through an opening, such as the opening 112. If the lid 14 includes two openings, such as the openings 30, 32, then a user can pour fluids out of the container 12 through one opening and sip or suck fluids from the second opening. When it is desired to close the closure 60, a force may be applied to the activator 62 and this may cause the cover 64 to seal the one or more openings, such as the openings 30, 32, 112. Advantageously, the systems 10, 100, 110 may be easily and conveniently used, straightforward to operate, and may have few parts, which may facilitate manufacturing and assembly of the system.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus comprising:
a lid;
at least one opening in the lid;
an activator pivotally connected to the lid, the activator movable between an open position and a closed position, the activator movable in a first direction when the activator moves from the closed position to the open position, the activator movable in a second, opposing direction when the activator moves from the open position to the closed position;
a cover pivotally connected to the lid, the cover movable between an open position and a closed position relative to the at least one opening in the lid, the cover movable in a first direction when the cover moves from the closed position to the open position, the cover movable in a second, opposing direction when the cover moves from the open position to the closed position; and
a connecting member including a first portion connected to the activator and a second portion connected to the cover, the connecting member biasing the cover to remain in the closed position when the cover and the activator are in the closed position;
wherein movement of the activator from the closed position to the open position overcomes a biasing force of the connecting member and moves the cover from the closed position to the open position;
wherein movement of the activator from the open position to the closed position moves the cover from the open position to the closed position;
wherein the activator is pivotally coupled to the lid in a first fixed position;
wherein the cover is pivotally coupled to the lid in a second fixed position; and
wherein a distance between a coupling of a first portion of the connecting member to the activator and a coupling of a second portion of the connecting member to the cover increases and decreases as the activator moves between the open and closed positions.

2. The apparatus as in claim 1, wherein movement of the activator from the closed position to the open position causes the cover to move from the closed position to the open position at substantially the same time and in substantially the same direction as the activator; and
wherein movement of the activator from the open position to the closed position causes the cover to move from the open position to the closed position at substantially the same time and in substantially the same direction as the activator.

3. The apparatus as in claim 1, wherein the activator rotates relative to the lid between the open and closed position;
wherein the cover rotates relative to the lid between the open and closed position;
wherein the activator and cover rotate in generally the same direction relative to the lid between the open and the closed positions.

4. The apparatus as in claim 1, wherein the connecting member comprises a biasing portion, the biasing portion biasing the cover to remain in the closed position when the cover is in the closed position.

5. The apparatus as in claim 4, wherein the biasing portion allows a length of the connecting member to vary and the length of the connecting member varies as the activator and the cover move between the open and the closed positions.

6. The apparatus as in claim 1, wherein the activator, the cover and the connecting member comprise an over center latch mechanism.

7. The apparatus as in claim 1, wherein the activator is pivotally connected to the lid about a first axis of rotation, the cover is pivotally connected to the lid about a second axis of rotation, the connecting member is pivotally connected to the activator about a third axis of rotation, and the connecting member is pivotally connected to the cover about a fourth axis of rotation; and
wherein the first axis of rotation is disposed in a first fixed position relative to the lid and the second axis of rotation is disposed in a second fixed position relative to the lid.

8. The apparatus as in claim 1, wherein when a force applied to the activator overcomes a biasing force of the connecting member, the cover can be moved from the closed position to the open position; and
wherein when a force applied to the activator to overcomes a biasing force of the connecting member, the cover can be moved from the open position to the closed position.

9. The apparatus as in claim 1, wherein the connecting member provides a spring force; and
wherein movement of the cover from the closed position to the open position requires sufficient force to overcome the spring force.

10. The apparatus as in claim 1, wherein the connecting member biases the cover into the closed position when the activator is moved into the closed position.

11. The apparatus as in claim 1, wherein a force applied to the activator must overcome a biasing force to allow the activator to be moved from the first position to the second position and the cover to be moved from the closed position to the open position.

12. The apparatus as in claim 1, wherein the closure is an over center latching mechanism;
wherein an amount of force applied to the activator must allow the activator to rotate past a center point of the over center latching mechanism to allow the activator to move from the closed position to the open position and to dispose the cover in the open position; and wherein an amount of force applied to the activator must allow the activator to rotate past the center point of the over center latching mechanism to allow the activator to move from the open position to the closed position and the connecting member secures the cover in the closed position.

13. The apparatus as in claim 1, wherein the closure is an over center latching mechanism;

wherein an amount of force applied to the activator must allow the activator to rotate past a center point of the over center latching mechanism to allow the activator to move from the closed position to the open position and to dispose the cover in the open position; and wherein an amount of force applied to the activator must allow the activator to rotate past the center point of the over center latching mechanism to allow the activator to move from the open position to the closed position.

14. An apparatus comprising:
a lid;
one or more openings in the lid; and
a closure coupled to the lid, the closure movable between a first position and a second position, the closure comprising:
  an activator coupled to the lid about a first axis of rotation, the first axis of rotation disposed in a fixed location relative to the lid, the activator movable between an open position and a closed position;
  a cover coupled to the lid about a second axis of rotation, the second axis of rotation disposed in a fixed location relative to the lid, a constant distance separating the first axis of rotation and the second axis of rotation, the cover movable between an open position and a closed position; and
  a connecting member connected to the activator and the cover, the activator, the cover and the connecting member forming an over center latching mechanism, a length of the connecting member changing as the cover moves between the open and the closed positions;
wherein the cover in the closed position inhibits fluid flow through the one or more openings in the lid; and
wherein the cover in the open position allows fluid flow through the one or more openings in the lid.

15. The apparatus as in claim 14, wherein the activator is pivotally coupled to the lid, the cover is pivotally coupled to the lid, the connecting member is pivotally connected to the activator about a third axis of rotation, and the connecting member is pivotally connected to the cover about a fourth axis of rotation;
wherein the third axis of rotation and the fourth axis of rotation move relative to the lid when the cover is moved between the open and the closed positions; and
wherein a distance between the third axis of rotation and the fourth axis of rotation changes as the cover is moved between the open and the closed positions.

16. The apparatus as in claim 14, further comprising a biasing mechanism that allows a length of the connecting member to change as the activator moves between the open and the closed positions, the biasing mechanism biasing the cover to remain in the closed position when the cover is in the closed position.

17. The apparatus as in claim 14, wherein an amount of force applied to the activator must allow the activator to rotate past a center point of the over center latching mechanism to move the activator from the closed position to the open position and to move the cover from the closed position to the open position; and wherein an amount of force applied to the activator must allow the activator to rotate past the center point of the over center latching mechanism to allow the activator to move from the open position to the closed position and to secure the cover in the closed position.

18. The apparatus as in claim 14, wherein movement of the activator from the closed position to the open position causes the cover to move from the closed position to the open position at substantially the same time and in substantially the same direction as the activator; and wherein movement of the activator from the open position to the closed position causes the cover to move from the open position to the closed position at substantially the same time and in substantially the same direction as the activator.

19. An over center latching mechanism sized and configured to control access to a fluid disposed within a container, the over center latching mechanism comprising:
a lid;
at least one opening in the lid; and
a closure coupled to the lid, the closure comprising:
  an activator pivotally connected to the lid about a first, fixed axis of rotation relative to the lid;
  a cover pivotally connected to the lid about a second, fixed axis of rotation relative to the lid, the cover movable between an open position and a closed position relative to the at least one opening in the lid, the first axis of rotation and the second axis of rotation spaced apart by a fixed distance; and
  a connecting member including a first end pivotally connected to the activator about a third axis of rotation and a second end pivotally connected to the cover about a fourth axis of rotation, the connecting member including a biasing portion that provides a biasing force that must be overcome to move the cover between the open and closed positions, the biasing portion biasing the cover to remain in the closed position when the cover is in the closed position;
wherein the third axis of rotation and the fourth axis of rotation move relative to the lid as the cover is moved between the open and closed positions; and
wherein a distance between the third axis of rotation and the fourth axis of rotation changes as the cover is moved between the open and closed positions.

20. An apparatus comprising:
a lid;
at least one opening in the lid;
an activator pivotally connected to the lid, the activator movable between an open position and a closed position, the activator movable in a first direction when the activator moves from the closed position to the open position, the activator movable in a second, opposing direction when the activator moves from the open position to the closed position;
a cover pivotally connected to the lid, the cover movable between an open position and a closed position relative to the at least one opening in the lid, the cover movable in a first direction when the cover moves from the closed position to the open position, the cover movable in a second, opposing direction when the cover moves from the open position to the closed position; and
a connecting member including a first portion connected to the activator and a second portion connected to the cover, the connecting member biasing the cover to remain in the closed position when the cover and the activator are in the closed position;

wherein:
movement of the activator from the closed position to the open position moves the cover from the closed position to the open position;

movement of the activator from the open position to the closed position moves the cover from the open position to the closed position;

the activator is pivotally connected to the lid about a first axis of rotation, the cover is pivotally connected to the lid about a second axis of rotation, the connecting member is pivotally connected to the activator about a third axis of rotation, and the connecting member is pivotally connected to the cover about a fourth axis of rotation;

the first axis of rotation is disposed in a first fixed position relative to the lid and the second axis of rotation is disposed in a second fixed position relative to the lid; and a distance between the third axis of rotation and the fourth axis of rotation changes when the cover and lid are moved between the open and the closed positions.

* * * * *